(12) United States Patent
Okabayashi et al.

(10) Patent No.: US 7,953,935 B2
(45) Date of Patent: May 31, 2011

(54) CACHE MEMORY SYSTEM, AND CONTROL METHOD THEREFOR

(75) Inventors: Hazuki Okabayashi, Osaka (JP); Tetsuya Tanaka, Kyoto (JP); Ryuta Nakanishi, Kyoto (JP); Masaitsu Nakajima, Osaka (JP); Keisuke Kaneko, Kyoto (JP)

(73) Assignee: Panasonic Corporation, Osaka (JP)

( * ) Notice: Subject to any disclaimer, the term of this patent is extended or adjusted under 35 U.S.C. 154(b) by 681 days.

(21) Appl. No.: 11/816,858

(22) PCT Filed: Feb. 8, 2006

(86) PCT No.: PCT/JP2006/302141
§ 371 (c)(1),
(2), (4) Date: Aug. 22, 2007

(87) PCT Pub. No.: WO2006/112111
PCT Pub. Date: Oct. 26, 2006

(65) Prior Publication Data
US 2009/0100231 A1 Apr. 16, 2009

(30) Foreign Application Priority Data
Apr. 8, 2005 (JP) .................................. 2005-112839

(51) Int. Cl.
*G06F 13/00* (2006.01)
(52) U.S. Cl. .................. 711/141; 711/118; 711/123
(58) Field of Classification Search .................. 711/112, 711/141, 118, 123
See application file for complete search history.

(56) References Cited

U.S. PATENT DOCUMENTS

| | | | | |
|---|---|---|---|---|
| 5,375,216 A | * | 12/1994 | Moyer et al. | 711/123 |
| 5,524,225 A | | 6/1996 | Kranich | |
| 5,860,110 A | * | 1/1999 | Fukui et al. | 711/141 |
| 6,173,392 B1 | | 1/2001 | Shinozaki | |
| 7,246,204 B2 | | 7/2007 | Shirahige et al. | |
| 2002/0069331 A1 | | 6/2002 | Chauvel et al. | |
| 2004/0003179 A1 | | 1/2004 | Shirahige et al. | |
| 2004/0215896 A1 | | 10/2004 | McCalpin et al. | |
| 2005/0193058 A1 | * | 9/2005 | Yasuda et al. | 709/203 |
| 2007/0028055 A1 | | 2/2007 | Tanaka et al. | |
| 2007/0083718 A1 | | 4/2007 | Okabayashi | |
| 2007/0136530 A1 | | 6/2007 | Tanaka | |
| 2007/0143548 A1 | | 6/2007 | Nakanishi et al. | |
| 2007/0186048 A1 | | 8/2007 | Nakanishi et al. | |

FOREIGN PATENT DOCUMENTS
EP 0557884 9/1993
(Continued)

OTHER PUBLICATIONS

English language Abstract of JP 6-12327.

(Continued)

*Primary Examiner* — Yong Choe
(74) *Attorney, Agent, or Firm* — Greenblum & Bernstein, P.L.C.

(57) ABSTRACT

A cache memory system which readily accepts software control for processing includes: a cache memory provided between a processor and memory; and a TAC (Transfer and Attribute Controller) for controlling the cache memory. The TAC receives a command which indicates a transfer and an attribute operation of cache data and a target for the operation, resulting from the execution of a predetermined instruction by the processor, so as to request the operation indicated by the command against the address to the cache memory.

18 Claims, 18 Drawing Sheets

FOREIGN PATENT DOCUMENTS

| | | | |
|---|---|---|---|
| EP | 0602808 | A | 6/1994 |
| EP | 1182566 | A | 2/2002 |
| JP | 5119453 | | 2/1976 |
| JP | 60-45855 | | 3/1985 |
| JP | 6-12327 | | 1/1994 |
| JP | 2004-118305 | | 4/1994 |
| JP | 7-84879 | | 3/1995 |
| JP | 7-295882 | | 11/1995 |
| JP | 11-167520 | | 6/1999 |
| JP | 11-272551 | | 10/1999 |
| JP | 2003223360 | | 8/2003 |
| JP | 2004-38345 | | 2/2004 |
| JP | 2004-326758 | | 11/2004 |
| JP | 4008946 | | 9/2007 |
| JP | 4008947 | | 9/2007 |
| JP | 4009306 | | 9/2007 |
| WO | 2005050454 | | 6/2005 |
| WO | 2005050455 | | 6/2005 |
| WO | 2005066796 | | 7/2005 |
| WO | 2005091146 | | 9/2005 |

OTHER PUBLICATIONS

English language Abstract of JP 2003-223360.
English language Abstract of JP 2004-326758.
English language Abstract of JP 11-272551.
English language Abstract of JP 11-167520.
English language Abstract of JP 7-295882.
U.S. Appl. No. 11/910,831 to Yamamoto et al., filed Oct. 5, 2007.
English Language Abstract of JP 2004-118305.
English Language Abstract of JP 2004-38345.
English Language Abstract of JP 7-84879.
English Language Abstract of JP 60-45855.
U.S. Appl. No. 10/577,133.
English Language Abstract of WO 2005/091146.
English language translation of Japanese Office action dated Nov. 13, 2007.

* cited by examiner

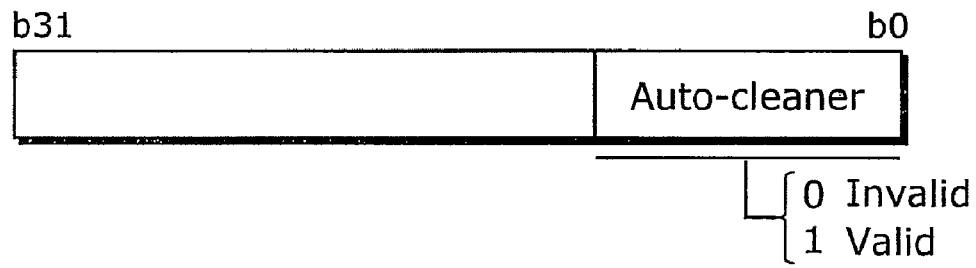

CACHE MEMORY SYSTEM, AND CONTROL METHOD THEREFOR

TECHNICAL FIELD

The present invention relates to cache memory systems, and control methods therefor, and particularly to a technique for improving software controllability over the cache memory systems.

BACKGROUND ART

In microprocessors of recent years, a high-speed cache memory with low storage capacity composed of, for example, a Static Random Access Memory (SRAM), has been installed within or near the microprocessor, and by storing a part of data in the cache memory, memory access speed of the microprocessor is increased.

Various techniques which aim to increase cache efficiency (to enhance a hit ratio and reduce cache miss latency) are known conventionally. One of such techniques is preloading (or prefetching), by which data to be used in the near future is filled in advance into the cache before a cache miss occurs (for example, Patent Reference 1). This technique can reduce cache misses by loading a line that includes a designated address into the cache by a prefetch instruction.

Patent Reference 1: Japanese Unexamined Patent Application No. 7-295882

DISCLOSURE OF INVENTION

Problems that Invention is to Solve

However, with the above-mentioned conventional techniques, monitoring the status of access to the memory by hardware and controlling hardware to perform caching operations autonomously may cause unnecessary transfer due to the difficulty of obtaining an accurate prediction. This is not limited to the above-mentioned conventional techniques, but the same applies to various techniques aiming to increase cache efficiency. Utilizing software to assist control can be considered as an approach to overcoming the limit on cache efficiency that lies in autonomous control by hardware.

The present invention has been considered in view of the above-described problem. An object of the present invention is to provide a cache memory system with an optimal structure for readily accepting control from software to perform an operation.

Means to Solve the Problems

In order to solve the above-mentioned problem, the cache memory system of the present invention includes: a cache memory provided between a processor and a memory; and a transfer and attribute controller which controls the cache memory. The transfer and attribute controller includes: a command entry unit for receiving a command, which results from an execution of a predetermined instruction by the processor and indicates a transfer and attribute operation of cache data and an address designating the target for the operation; and an operation request unit for requesting, on the address to the cache memory, an operation which is indicated by the command.

Further, the command entry unit may also receive, from the processor, an address area corresponding to the command, and the operation request unit may successively request, to the cache memory, the operation on plural addresses belonging to the address area.

With this structure, the transfer and attribute operation of the cache data can be requested from software by causing the processor to execute the predetermined instruction. Thus, it is possible to obtain a cache memory system with a preferred structure for readily receiving control from software to perform the processing.

Furthermore, the cache memory may include, in association with a cache entry which is a unit for managing cache data: a tag storage unit which stores a tag indicating a significant part of a memory address corresponding to the cache data stored in the cache entry; and a flag storage unit which stores the following: a valid flag indicating whether or not the cache entry is valid; a dirty flag indicating whether or not a write operation has been performed on the cache entry, and a weak flag indicating that an access order of the cache entry has been rendered oldest. The cache memory may execute one of the following operations in response to a request from the transfer and attribute controller: a filling operation which is performed, in the case where there is no cache entry in which a hit occurs for a designated address, by selecting a cache entry to be a replacement target, loading data corresponding to the designated address from a memory into the selected cache entry, defining a value of the tag, and setting the valid flag; a touch operation which is performed, in the case where there is no cache entry in which a hit occurs for a designated address, by selecting the cache entry to be the replacement target, defining the value of the tag and setting the valid flag, without loading data from the memory into the selected cache entry; a write back operation which is performed, in the case where there is a cache entry in which a hit occurs for a designated address and the dirty flag is already set, by saving the data of the cache entry into the memory and resetting the dirty flag; an invalidation operation which is performed, in the case where there is a cache entry in which a hit occurs for a designated address, by resetting the valid flag without saving the data of the cache entry into the memory, regardless of the value of the dirty flag; a write back and invalidation operation which is performed, in the case where there is a cache entry in which a hit occurs for a designated address, by saving the data of the cache entry into the memory and resetting the dirty flag and the valid flag when the dirty flag is already set, and carrying out only the resetting of the valid flag of the cache entry when the dirty flag is already reset; and a weakening operation which is performed, in the case where there is a cache entry in which a hit occurs for a designated address, by setting the weak flag of the cache entry.

This structure makes these six kinds of operations effective for improvement in cache hit ratio, reduction in unnecessary bus transactions, and leveling bus transactions (temporal distribution), and is preferable for readily receiving control from software and performing the processing to improve cache efficiency.

Furthermore, the transfer and attribute controller may also include an address adjusting unit which adjusts the start address and the end address of the address area so that the addresses indicate the starting data of a cache entry which is the unit for managing cache data in the cache memory, and the operation request unit may successively request, to the cache memory, the operation on plural addresses in the adjusted address area.

With this structure, the address adjusting unit adjusts the start address and the end address of the address area so that the addresses indicate the starting data of a cache entry. Thus, a programmer or a compiler is not required to manage a line border and a line size of the cache memory and the burden that lies in cache management is reduced.

Further, the transfer and attribute controller may also include: a command storage unit which stores plural commands and address areas corresponding to the respective commands; and a command selecting unit which selects a command from among the stored commands. The operation request unit may successively request the operation, indicated by the command, on the addresses belonging to the address area corresponding to the selected command.

Preferably, the command selecting unit may select another command before all requests regarding the selected command are made, and the operation request unit, when the former selected command is reselected, may successively request the operation regarding the former selected command on addresses to which the operation of the former command has not been requested yet.

This structure allows the transfer and attribute controller to perform processing while keeping plural commands, and is preferable, for example, in the case where such as the plural commands are given, when the processor executes a multitask processing.

Furthermore, the transfer and attribute controller may also include: an execution judging unit which judges whether or not a specific instruction has been executed by the processor on a prediction address designated for the operation to be requested next; and an effective address generating unit which generates, when the judgment is affirmative, an effective address by adding or subtracting a predetermined offset value to or from the prediction address, and the operation request unit may request the operation on the generated effective address.

Preferably, the transfer and attribute controller may further includes a command storage unit which stores plural commands and the address areas related to the respective commands. The execution judging unit may judge, regarding each of the stored commands, whether or not a specific instruction on the prediction address corresponding to each of the stored commands has been executed by the processor. The transfer and attribute controller may further include a command selecting unit which selects a command from among the commands judged affirmatively. The effective address generating unit may generate an effective address by adding or subtracting a predetermined value to or from the prediction address corresponding to the selected command. The operation request unit may request the operation, on the generated effective address, which has been indicated by the selected command.

This structure is preferable especially when the specific instruction is an instruction including pre-fetch. It is possible to efficiently operate the cache entry since the operation is requested on a target of the instruction in synchronization with the execution of the instruction.

Furthermore, the transfer and attribute controller may also include an address outputting unit which successively outputs the address which designates each cache entry which is the unit for managing cache data in the cache memory. The operation request unit may request, to the cache memory, a successive operations on at least one cache entry including the cache entry designated by the outputted address. The cache memory may execute the successive operations according to the request.

The successive operations, here, may be the write back operations.

With this structure, it is obviously effective for an equalization of bus transactions (temporal distribution).

The command entry unit may receive, from the processor: a single command which indicates the operation on a single address; an instruction-triggered command which indicates that the operation plural addresses included in the address area is executed in synchronization with a specific instruction to be executed by the processor; an area command which indicates that the operation on plural addresses included in the address area is executed in asynchronization with the specific instruction to be executed by the processor; and an auto-cleaner command which indicates that cache data is successively written back. The operation request unit may select an operation request corresponding to each command, based on a predetermined order of priority and request the operation to the cache memory.

The predetermined order of priority, here, may be the order of the commands. This structure makes it possible to request the operation in a preferred order in accordance with the execution mode of each operation.

Furthermore, the present invention can be realized as not only the cache memory system mentioned above, but also a method for controlling the cache memory system which includes the steps of processings which are executed by the characteristic units of the cache memory system.

Effects of the Invention

With the cache memory system of this invention, by causing the processor to execute the predetermined instruction, a transfer and attribute operation of cache data can be requested by software. Thus, it is possible to obtain the cache memory system which has a suitable structure for readily accepting control from software to perform processing.

In order to enhance cache efficiency, by adopting effective operations for improving cache efficiency as the above-mentioned operation, and by performing these operations under active control from the software, it is possible to optimally share functions between the hardware and the software. Consequently, it is also possible to avoid unnecessarily upsizing the hardware, for the purpose of improving cache efficiency by autonomous control.

BRIEF DESCRIPTION OF DRAWINGS

FIG. 12(a) is a diagram showing an example of the instruction for writing a command into the TAC control register. FIG. 12(b) is a diagram showing an example of a command.

NUMERICAL REFERENCES

Figure 1:
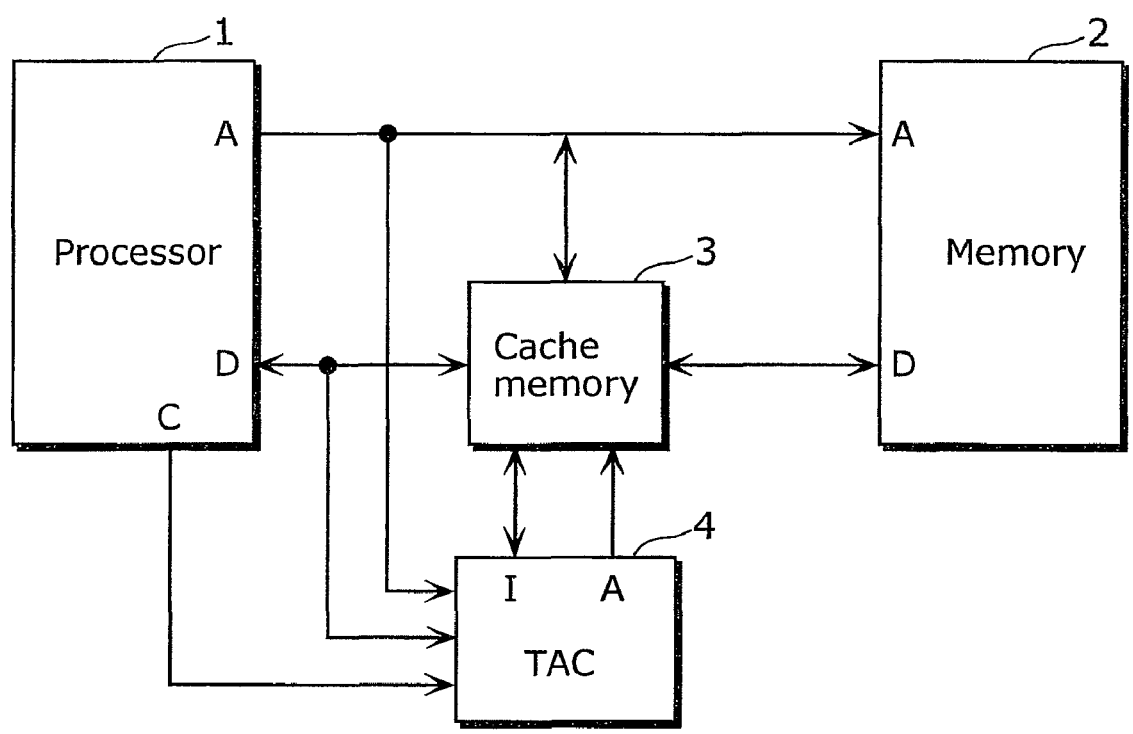
FIG. 1 is a block diagram showing an example of the overall structure of a computer system that includes a processor, a cache memory, a memory and a TAC according to an embodiment of the present invention.

1 Processor
2 Memory
3 Cache memory
4 TAC
20 Address register
2 Memory I/F
22 Demultiplexer
30 Decoder
31a to 31d Way
32a to 32d Comparator
33a to 33d AND circuit
34 OR circuit
35 Selector
36 Selector
37 Demultiplexer
38 Control unit
40 Command entry control unit
42 Instruction-triggered command control unit
43 Auto-cleaner control unit
44 Operation request unit
401 Operation primitive register
402 Start address register
403 Size register
404 Command register
405 TAC control register
411 Address adjusting unit
412 Command storage unit
413 Command selecting unit
421 Address adjusting unit
422 Command storage unit
423 Execution judging unit
424 Command selecting unit
425 Effective address generating unit
431 Cleaning address outputting unit

BEST MODE FOR CARRYING OUT THE INVENTION

Embodiments according to the present invention will be described below with reference to the drawings.

<Overall Structure>

FIG. 1 is a block diagram showing the overall structure of a computer system that includes a processor 1, a memory 2, a cache memory 3 and a TAC (Transfer and Attribute Controller) 4 according to an embodiment of the present invention. The cache memory 3 and the TAC 4 according to this embodiment correspond to the cache memory system of this invention.

By an execution of a predetermined instruction by the processor 1, the TAC 4 receives a command which indicates a transfer and attribute operation of cache data and an address designating a target for the operation. The TAC 4 requests the cache memory 3 to execute the operation indicated by the command.

The cache memory 3 caches data, in response to a memory access from the processor 1, in such a manner that conventional cache memories as commonly used perform data caching. When not processing a memory access from the processor 1, the cache memory 3 executes, in response to a request from the TAC 4, one of six kinds of transfer and attribute operations for cache data or an auto-cleaner. These six kinds of operations are called operation primitives. Later, the operation primitives and the auto-cleaner will be described in detail.

The above mentioned configuration for the cache memory system of this invention is suitable for readily accepting control from software which is employed for overcoming a limit on cache efficiency which arises when the cache memory is controlled autonomously by hardware.

<Structure of Cache Memory>

Hereinafter, as a specific example of the cache memory 3, it is explained about a structure in the case where the present invention is applied to a cache memory of a four-way set associative method.

Figure 2:
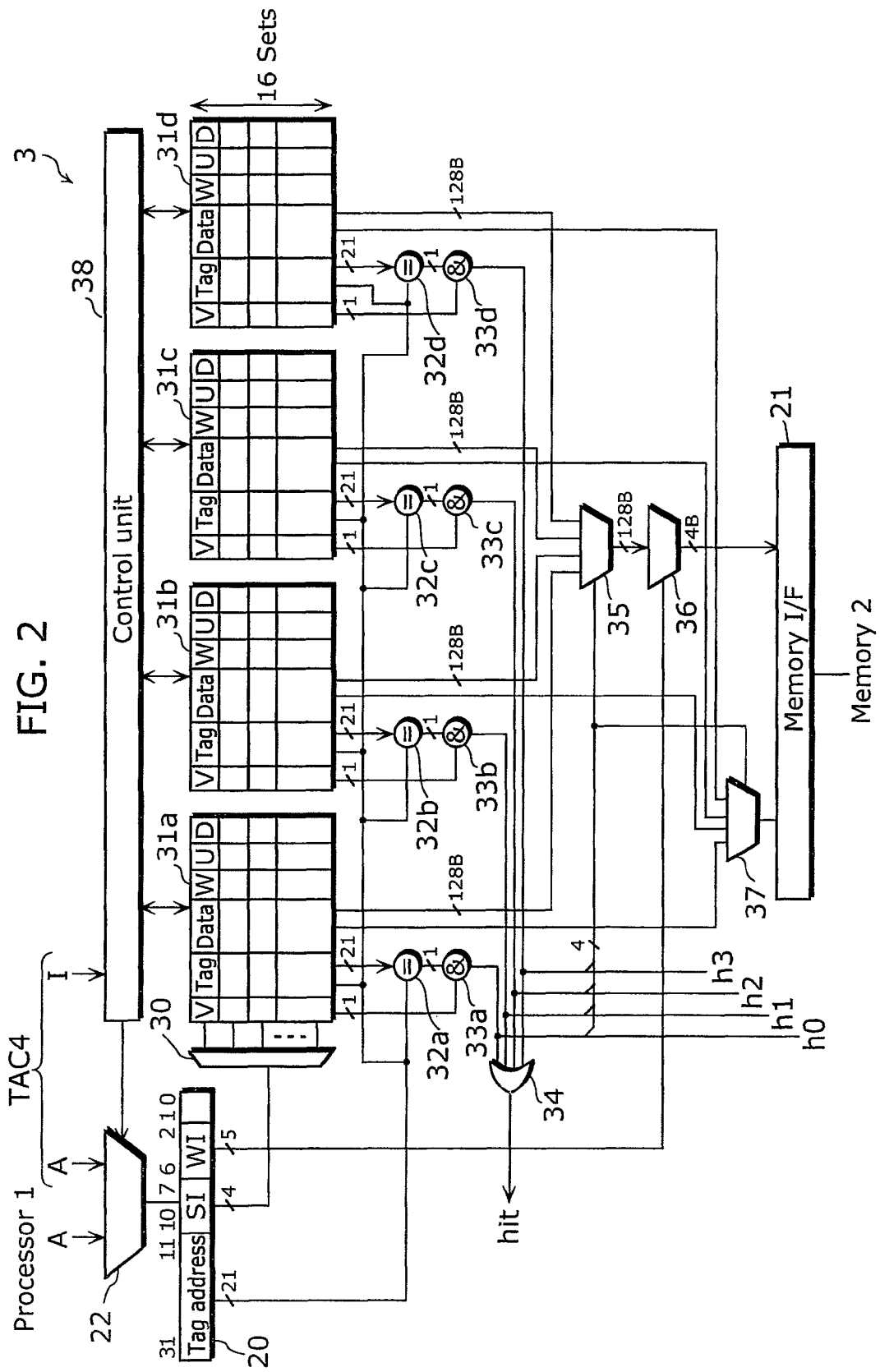
FIG. 2 is a block diagram showing an example of the structure of the cache memory.

FIG. 2 is a block diagram showing an example of a structure of the cache memory 3. As shown in the diagram, the cache memory 3 includes an address register 20, a memory I/F 21, a demultiplexer 22, a decoder 30, four ways 31a to 31d (hereafter abbreviated as way 0 to 3), four comparators 32a to 32d, four AND circuits 33a to 33d, an OR circuit 34, selectors 35 and 36, a demultiplexer 37 and a control unit 38.

According to control from the control unit 38, the demultiplexer 22 preferentially selects an access address to the memory 2 provided from the processor 1. While no memory access is received from the processor 1, the demultiplexer 22 selects an address provided from the TAC 4.

The address register 20 is a register that holds a selected access address. This access address is assumed to be 32 bits. As shown in this diagram, the access address includes a 21-bit tag address, a 4-bit set index (SI in the diagram) and a 5-bit word index (WI in the diagram) in this order starting with the most significant bit. Here, the tag address indicates an area (whose size is the number of sets multiplied by block) in the memory to be mapped to a way. The size of the area is determined by an address bit (A10 to A0) that is less significant than the tag address, or in other words, is 2 kilobytes, and is also the size of one way. The set index (SI) indicates one of the sets spanning the ways 0 to 3. The number of sets is 16 since the set index is 4 bits. The cache entry specified by the tag address and the set index is a unit for replacement, and when stored in the cache memory, is called line data or a line. The size of line data is determined by an address bit less significant than the set index, or in other words, is 128 bytes. Assuming that one word is 4 bytes, one line data is 32 words. The word index (WI) indicates one word among plural words that make up the line data. The least significant 2 bits (A1 and A0) in the address register 20 are ignored at the time of a word access.

The memory I/F 21 is an I/F used for an access from the cache memory 3 to the memory 2, such as a data write back from the cache memory 3 to the memory 2, a data loading from the memory 2 to the cache memory 3.

The decoder 30 decodes the 4 bits of the set index so as to select one set out of the 16 sets spanning the four ways 0 to 3.

The four ways 0 to 3 are four ways that have the same structures and have an amount of memory of 4×2 kilobytes. Each way has 16 cache entries. Each one of cache entries has a valid flag V, a tag of 21 bits, line data of 128 bytes, a weak flag W, a use flag U and a dirty flag D.

The tag is a copy of the tag address of 21 bits. The line data is a copy of the 128-byte data in a block specified by the tag address and the set index.

The valid flag V indicates whether the data in the cache entry is valid or not.

The weak flag W indicates, with regard to an access from the processor, whether an access frequency of the access is low or not. As to a replacement control in the cache memory, the weak flag W indicates that an access order of the cache entry is regarded compulsorily as the oldest; that is, the time when the cache entry is accessed is regarded as older than those of accesses to any other cache entries. The weak flag W indicates the best replacement target to be evicted prior to any other cache entries.

The use flag U indicates whether or not the cache entry has been accessed, and is used in place of an access order data of the cache entries in the LRU method. More precisely, 1 of the use flag U indicates that there has been an access, and 0 indicates there has been no access. However, when all use flags become 1 in the four ways of one set, the use flags, other than the use flag to be set of the way, are reset to 0. In other words, the use flag U indicates two relative states of old and new timings when a cache entry was accessed. That means, a cache entry whose use flag U is 1 has been accessed later than a cache entry whose use flag is 0.

The dirty flag D indicates whether or not the processor has performed writing on the cache entry; that is, whether or not it is necessary to write back the cached data to the memory since the cached data in the line may differ from the data in the memory as a result of the writing.

The comparator 32a compares the tag address in the address register 20 with the tag of the way 0 among the four tags included in the set selected by the set index, in order to see whether or not they agree with each other. The same explanation applies to the comparators 32b to 32c, except in that the comparators 32b to 32c respectively corresponds to the ways 31b to 31d.

The AND circuit 33a performs AND operation between the valid flag and the comparison result obtained by the comparator 32a. The comparison result of applying this AND operation is referred to as h0. When the comparison result h0 is 1, this means that the tag address in the address register 20 matches the line data corresponding to the set index; that is, there has been a hit in the way 0. When the comparison result h0 is 0, this means there is a cache miss. The same explanation applies to the AND circuits 33b to 33d, except that the AND circuits 33b to 33d respectively correspond to the ways 31b to 31d. The comparison results h1 to h3 respectively indicate whether there is a hit or miss in the ways 1 to 3.

The OR circuit 34 performs an OR operation for the comparison results h0 to h3. This result of the OR operation is referred to as a "hit". The "hit" indicates whether or not there is a hit in the cache memory.

The selector 35 selects line data of a hit way from among the line data of ways 0 to 3 in the selected set.

The selector 36 selects, from among the line data of 32 words selected by the selector 35, a word indicated in the word index.

The demultiplexer 37 outputs to-be-written data to one of the ways 0 to 3, when data is written into the cache entry. The unit of the to-be-written data may be a unit of a word.

The control unit 38 performs overall control on the cache memory 3.

<Description of the Use Flag U>

Figure 3:
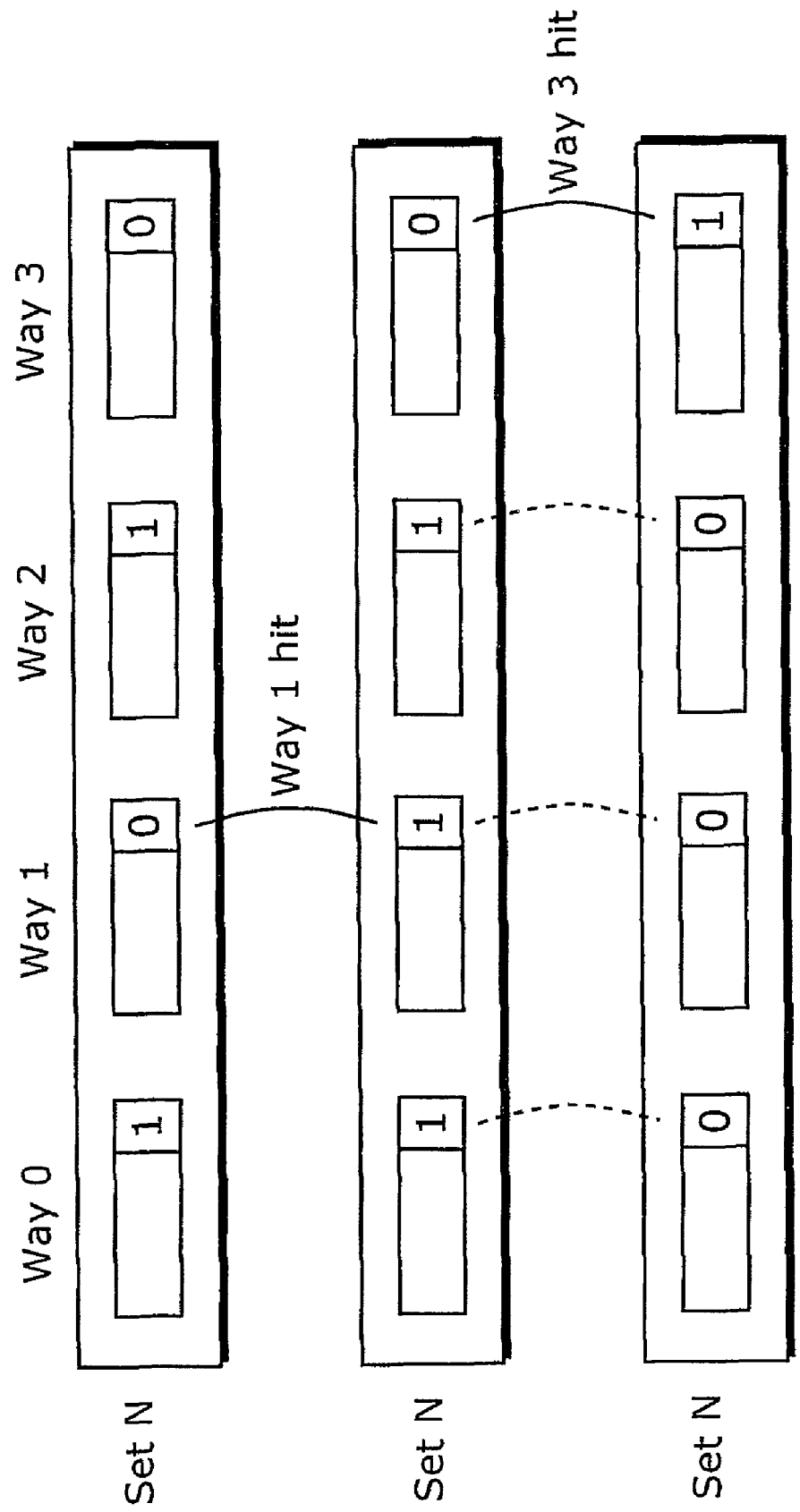
FIG. 3 is a diagram showing an example of an update of use flags.

FIG. 3 shows an example of updating use flags by the control unit 38. An upper stage, a middle stage and a lower stage of this diagram show four cache entries which make up a set N spanning the ways 0 to 3. The value 1 or 0 in the right end of the four cache entries indicates a value of respective use flags. These four use flags U are referred to as U0 to U3.

It is indicated as (U0 to U3)=(1, 0, 1, 0) in the upper stage in this diagram, which means that the cache entries in the ways 0 and 2 have been accessed, while the cache entries in the ways 1 and 3 have not been accessed.

In this state, when a hit occurs in the cache entry of the way 1 in the set N during a memory access, the use flags U are updated to (U0 to U3)=(1, 1, 1, 0) as shown in the middle stage in the diagram. In other words, the use flag U1 in the way 1 is updated from 0 to 1 as indicated by the solid line.

Further, when a hit occurs in the cache entry of the way 3 in the set N during a memory access in the state shown in the middle stage in the diagram, the use flags U are updated to (U0 to U3)=(0, 0, 0, 1) as shown in the lower stage in the diagram. In other words, the use flag U1 in the way 3 is updated from 0 to 1 as indicated by the solid line. Furthermore, the use flags U0 to U2 in the ways other than the way 3, are updated from 1 to 0 as indicated by dashed lines. Consequently, it is shown that the cache entry of the way 3 has been accessed more recently than each cache entry in the ways 0 to 2.

When no cache entry in which W=1 exists at the time of a cache miss, the control unit 38 determines a cache entry to be replaced based on the use flags and carries out replacement. For example, the control unit 38 determines any of the ways 1 and 3 to be replaced in the upper stage in FIG. 3, determines the way 3 to be replaced in the middle stage in FIG. 3, and determines any of ways 0 to 2 to be replaced in the lower stage in FIG. 3.

<Description of the Weak Flag W>

Figure 4A:
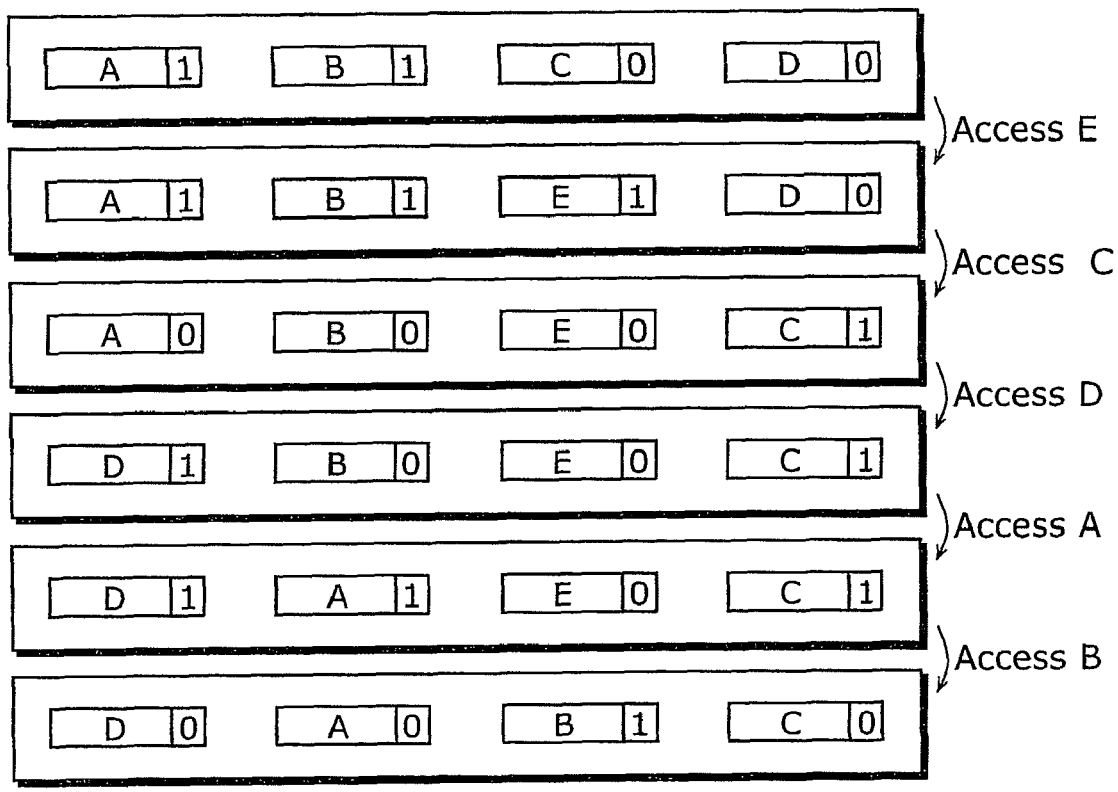
FIG. 4(a) is a diagram showing how a cache entry is replaced when no weak flag exists.

FIG. 4(a) is a comparative example of the case where the weak flag is assumed not to be present, and shows how the cache entry is replaced. This diagram also shows four cache entries which make up a set N spanning the ways 0 to 3. The value 1 or 0 in the right end of the four cache entries indicates a value of respective use flags. Only the data E is infrequently-accessed data, and the data A, B, C, and D are frequently-accessed data.

When the processor 1 accesses the data E in the state shown in the first stage of this diagram in FIG. 4(a), a cache miss occurs. Due to this cache miss, for example, the cache entry of the frequently-accessed data C, from among the cache entries in which U=0, is replaced by the infrequently-accessed data E, and the state in the second stage is arrived at.

When the processor 1 accesses the data C in the state shown in the second stage of this diagram, a cache miss occurs. Due to this cache miss, for example, the cache entry of the frequently-accessed data D, from among the cache entries in which U=0, is replaced by the frequently-accessed data C, and the state in the third stage is arrived at.

When the processor 1 accesses the data D in the state shown in the third stage of this diagram, a cache miss occurs. Due to this cache miss, for example, the cache entry of the frequently-accessed data A, is replaced by the frequently-accessed data D, and the state in the fourth stage is arrived at.

Similarly, in the fourth stage, the infrequently-used data E is not selected as the target to be replaced and remains in the cache memory.

Since the infrequently-used data E is the oldest (U=0) in the fifth stage, it is selected as the replacement target and evicted.

As described above, in the pseudo-LRU method (as well as in the normal LRU method), four cache misses may occur at worst in four-way due to the infrequently-accessed data E.

Figure 4B:
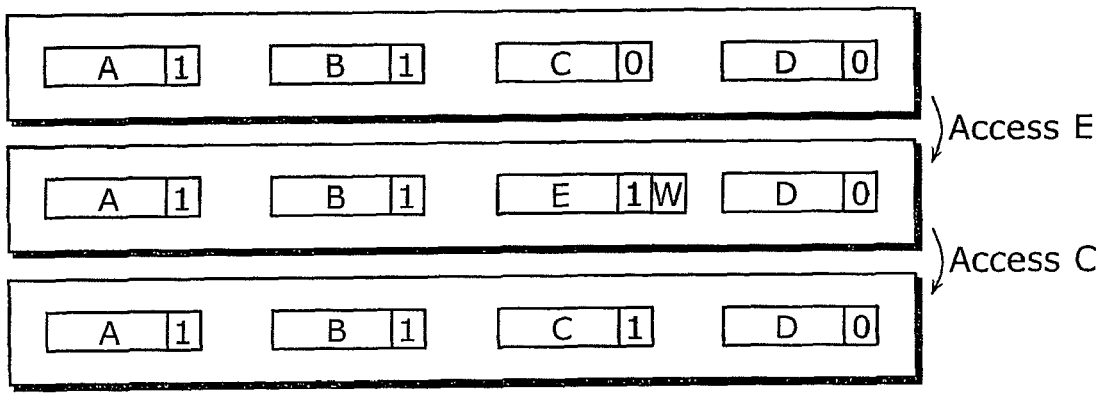
FIG. 4(b) is an illustration showing a function of a weak flag W in a replacement processing.

FIG. 4(*b*) is an illustration showing a role of the weak flag W in a replacement processing.

When the processor 1 accesses the data E, in the state shown in the first stage of FIG. 4(*b*) (the same state shown in the first stage of FIG. 4(*a*)), a cache miss occurs. Due to this cache miss, for example, the cache entry of the frequently-accessed data C, from among the cache entries in which U=0, is replaced by the infrequently-accessed data E. At this time, the processor 1 sets the weak flag W of 1 in the cache entry containing data E. By doing this, the cache entry containing the data E becomes first to be evicted at the next cache miss, and the state in the second stage is arrived at.

When the processor 1 accesses the data C in the state shown in the second stage, a cache miss occurs. Due to this cache miss, the cache entry of W=1 which contains the infrequently-accessed data E is selected as the target to be replaced and replaced by the frequently-accessed data C, and the state in the third stage is arrived at.

As descried above, by providing the weak flag W, it is possible to reduce the occurrence of cache misses due to infrequently-accessed data.

<Operation Primitives>

Next, the six kinds of operation primitives executed by the cache memory 3 are described. The operation primitives are the following operations directed to a single address designated by the TAC 4.

(1) Filling Operation: In the case where there is no cache entry in which a hit occurs for the address, a cache entry to be the replacement target is selected, data corresponding to the designated address is loaded from the memory to the selected cache entry, the value of the tag is defined and the valid flag V is set. This operation contributes to improvement of a cache hit ratio.

(2) Touch Operation: In the case where there is no cache entry in which a hit occurs for the address, a cache entry to be the replacement target is selected, the value of the tag is defined without loading data from the memory into the selected cache entry, and the valid flag V is set. This operation contributes to improvement of a cache hit ratio as well as reduction of unnecessary bus transactions.

(3) Write Back Operation: In the case where there is a cache entry in which a hit occurs for the address and the dirty flag D has been set, the data of the cache entry is saved into the memory and the dirty flag D is reset. This operation contributes to equalization of bus transactions (temporal distribution).

(4) Invalidation Operation: In the case where there is a cache entry in which a hit occurs for the address, the valid flag V is reset without saving the data of the cache entry into the memory, regardless of the value of the dirty flag. This operation contributes to reduction of unnecessary bus transactions.

(5) Write Back and Invalidation Operation: In the case where there is a cache entry in which a hit occurs for the address: when the dirty flag D is already set, the data of the cache entry is saved into the memory and the dirty flag D and the valid flag V are reset; and when the dirty flag D is already reset, only the resetting of the valid flag V of the cache entry is carried out. This operation contributes to equalization of bus transactions (temporal distribution).

(6) Weakening Operation: In the case where there is a cache entry in which a hit occurs for the address, the weak flag W of the cache entry is set. This operation contributes to improvement of a cache hit ratio.

<Operation Primitive Processing>

Figure 5:
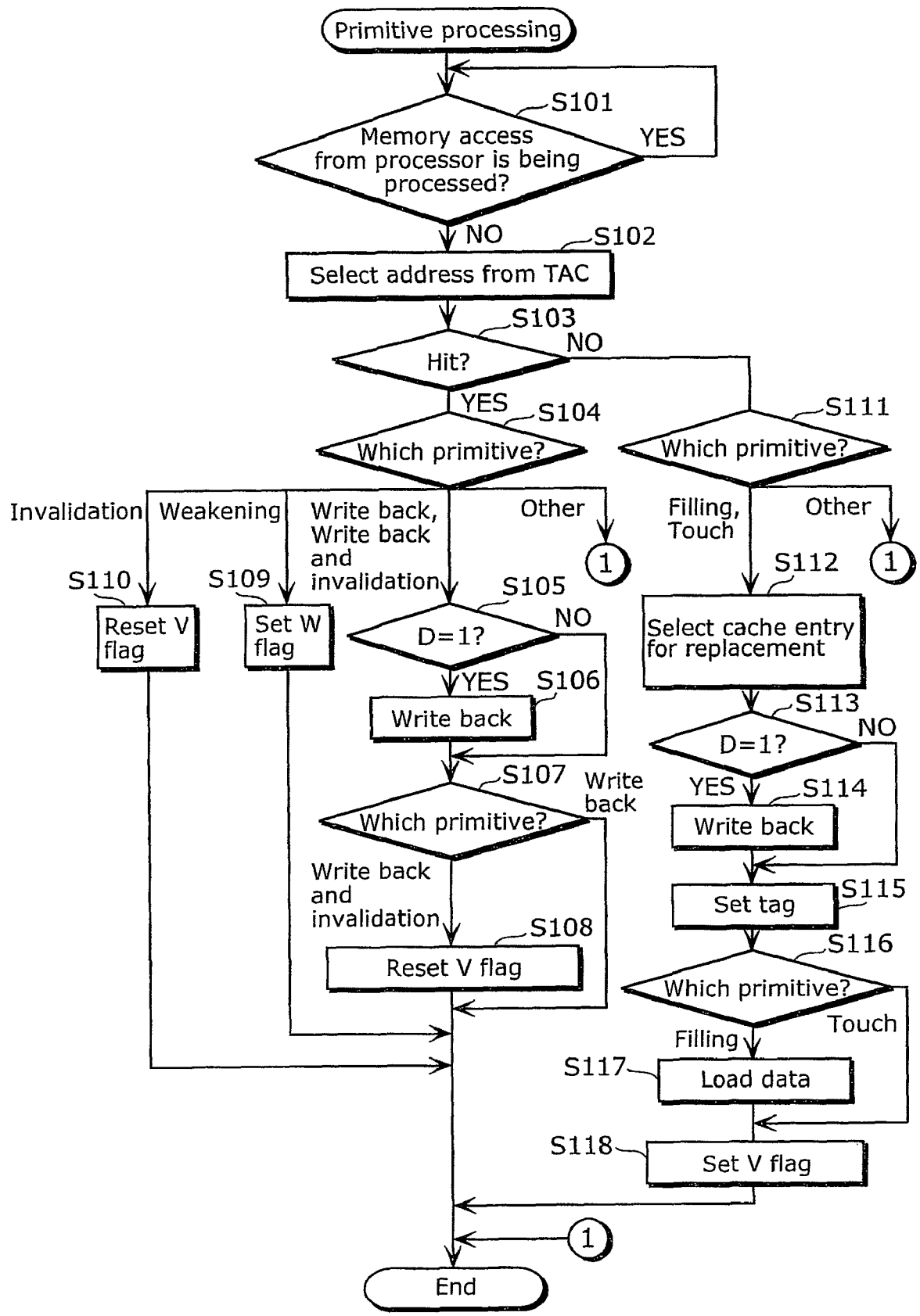
FIG. 5 is a flowchart showing an example of the processing of operation primitives in the cache memory.

FIG. 5 is a flowchart showing an example of the processing of the operation primitives in the cache memory 3. This operation primitive processing is initiated when a designation I which designates an operation primitive and an address A specifying the target for the operation are provided from the TAC 4, and then the designated operation primitive is executed.

In the case where the control unit 38 is processing a memory access from the processor 1, a wait is inserted until the end of the processing (S101: YES). During the period in which there is no memory access from the processor 1, an address provided from the TAC 4 is selected by the demultiplexer 22 (S102).

In the case where there is a cache entry in which a hit occurs for the address (S103: YES), only the invalidation, the weakening, the write back, or the write back and invalidation operations are executed as targeting the hit cache entry for the operation (S104). In the case where the designated operation primitive is the write back or the write back and invalidation and when the dirty flag D is already set to 1, the write back is carried out (S105 to S106). Further, when the designated operation primitive is the write back and invalidation, the valid flag V is reset (S107 to S108). In the case where designated operation primitive is the invalidation, the valid flag V is reset (S110). In the case of the weakening, the weak flag W is set (S109).

In the case where there is no cache entry in which a hit occurs for the address (S103: NO), only the filling and the touch operations are executed (S111). In this case, the cache entry to be the replacement target is selected first (S112), then the write back is executed when the dirty flag D in the cache entry is 1 (S113 to S114) and the tag address is set (S115). In addition, in the case where the designated operation primitive is the filling, the data is loaded from the memory into the cache entry (S117), and then the V flag is set (S118).

<Auto-cleaner>

Next, the auto-cleaner executed by the cache memory 3 is described. The auto-cleaner is the following operation directed to a single address designated by the TAC 4.

In the case where both the dirty flag D and the weak flag W have been set in each of the cache entries in the set indicated by the above-described address (referring to the FIG. 2, specifically, the four cache entries belonging to the set indicated by the set index S1 included in the address), the write back is executed.

This operation contributes to equalization of bus transactions (temporal distribution).

<Auto-Cleaner Processing>

Figure 6:
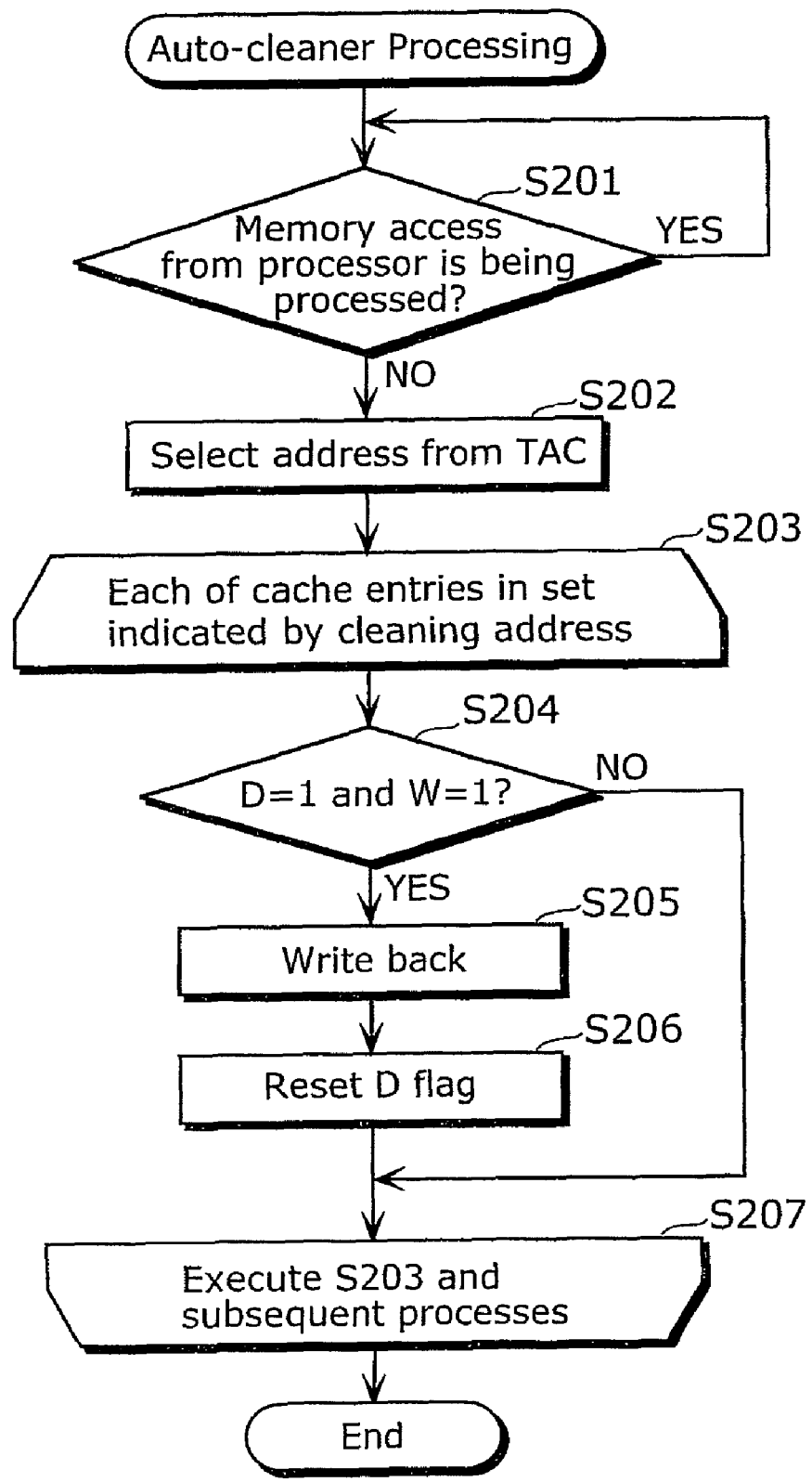
FIG. 6 is a flowchart showing an example of the processing of an auto-cleaner in the cache memory.

FIG. 6 is a flowchart showing an example of the processing of an auto-cleaner in the cache memory 3. This auto-cleaner processing is initiated, when a designation I which designates the auto-cleaner and an address A specifying the target for the processing are provided from the TAC 4.

In the case where the control unit 38 is processing a memory access from the processor 1, a wait is inserted until the end of the processing (S201: YES). During the period in which there is no memory access from the processor 1, an address provided from the TAC 4 is selected by the demultiplexer 22 (S202).

The following operation is repeated against each of the cache entries belonging to the set designated by the set index included in the address (S203 to S207).

In the case where both the dirty flag D and the weak flag W have been set to 1 (S204: YES), the write back is executed and the dirty flag is reset (S205 to S206).

<Variations>

It should be noted that the cache memory of the present invention is not limited to the structure described in the aforementioned embodiment, but various modifications can be applied. Hereafter, some of the variations are described.

(1) An example of a cache memory employing a four-way set associative is used for explanation in the afore-mentioned embodiment. However, the number of ways may be arbitrarily decided. In addition, in the aforementioned embodiment, the number of sets is described as 16, the number of sets may be arbitrarily decided.

(2) An example of a cache memory for a set-associative method is used for explanation in the afore-mentioned embodiment. However, the cache memory may be a cache memory for a full-associative method or for a direct-mapping method.

(3) The line is explained as a unit for replacement of cache data in the afore-mentioned embodiment. However, the unit for replacement may be a sub-line which is one of four parts obtained by dividing a line. In this case, each of the cache entry holds four valid flags and four dirty flags respectively.

Figure 7:
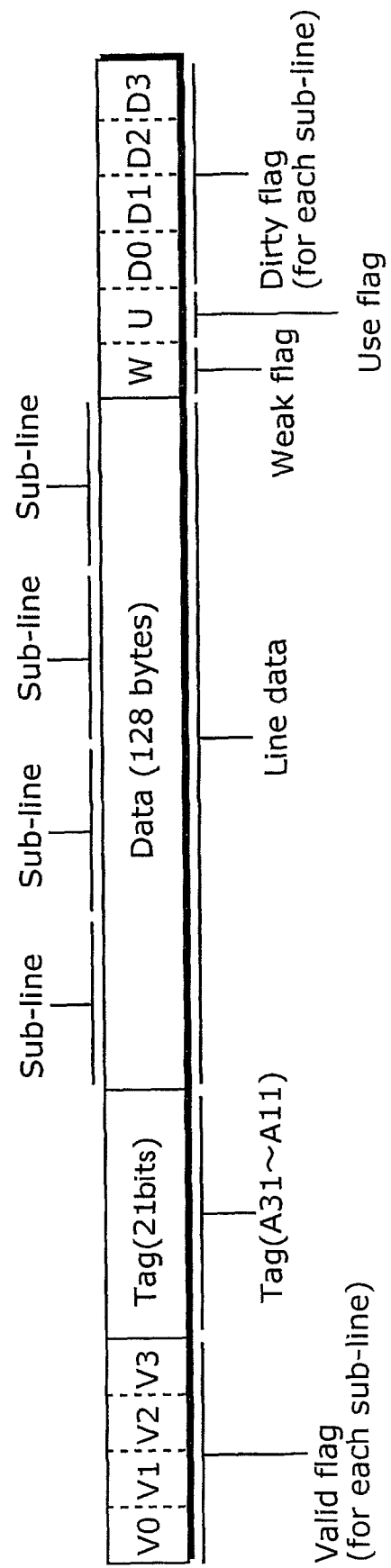
FIG. 7 is a diagram showing an example of the structure of a cache entry according to a variation.

FIG. 7 shows an example of the structure of a cache entry of the case mentioned above. Sub-lines having the size of a half, one-eighth or one-sixteenth of a line may be employed, in addition to sub-lines having the size of one-fourth of a line. In this case, each of the cache entry holds as many valid flags and dirty flags as the number of the sub-lines. The unit for replacement may be selected between a line and a sub-line according to an instruction of the TAC 4.

(4) A way in which some functions (the replacement function, for example) as a cache memory are restricted (an inactive way) may be provided. Each of the ways may be selected between an inactive way mentioned above and an active way whose functions are all available, according to an instruction of the TAC 4.

<An Example of an Interface Between the Cache Memory and the TAC>

Figure 8:
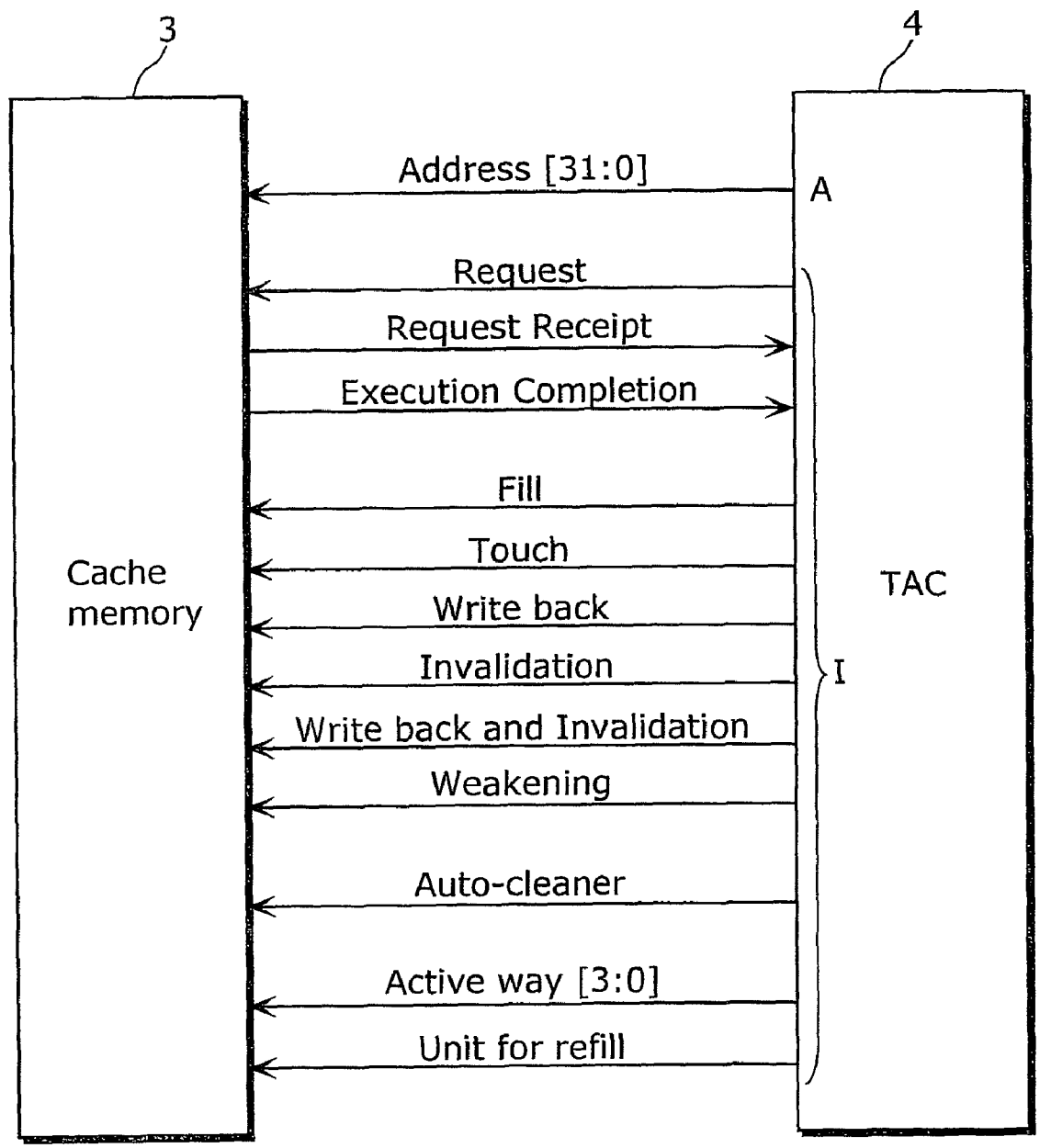
FIG. 8 is a diagram showing an example of an interface between the cache memory and the TAC.

FIG. 8 shows an example of an interface (signals sent and received) between the cache memory 3 and the TAC 4. In this example, the above-mentioned variations are taken into account.

A 32-bit address designates a target for an operation. A request, a request receipt and an execution completion are used for handshake regarding issuance of a request. A fill, a touch, a write back, an invalidation, a write back and invalidation, a weakening, and an auto-cleaner designate the target for an operation. A 3-bit active way designates each of ways as active or inactive. A unit for refill designates whether the unit for replacement should be a line or a sub-line.

<TAC Structure>

The structure of the TAC will be described below.

Figure 9:
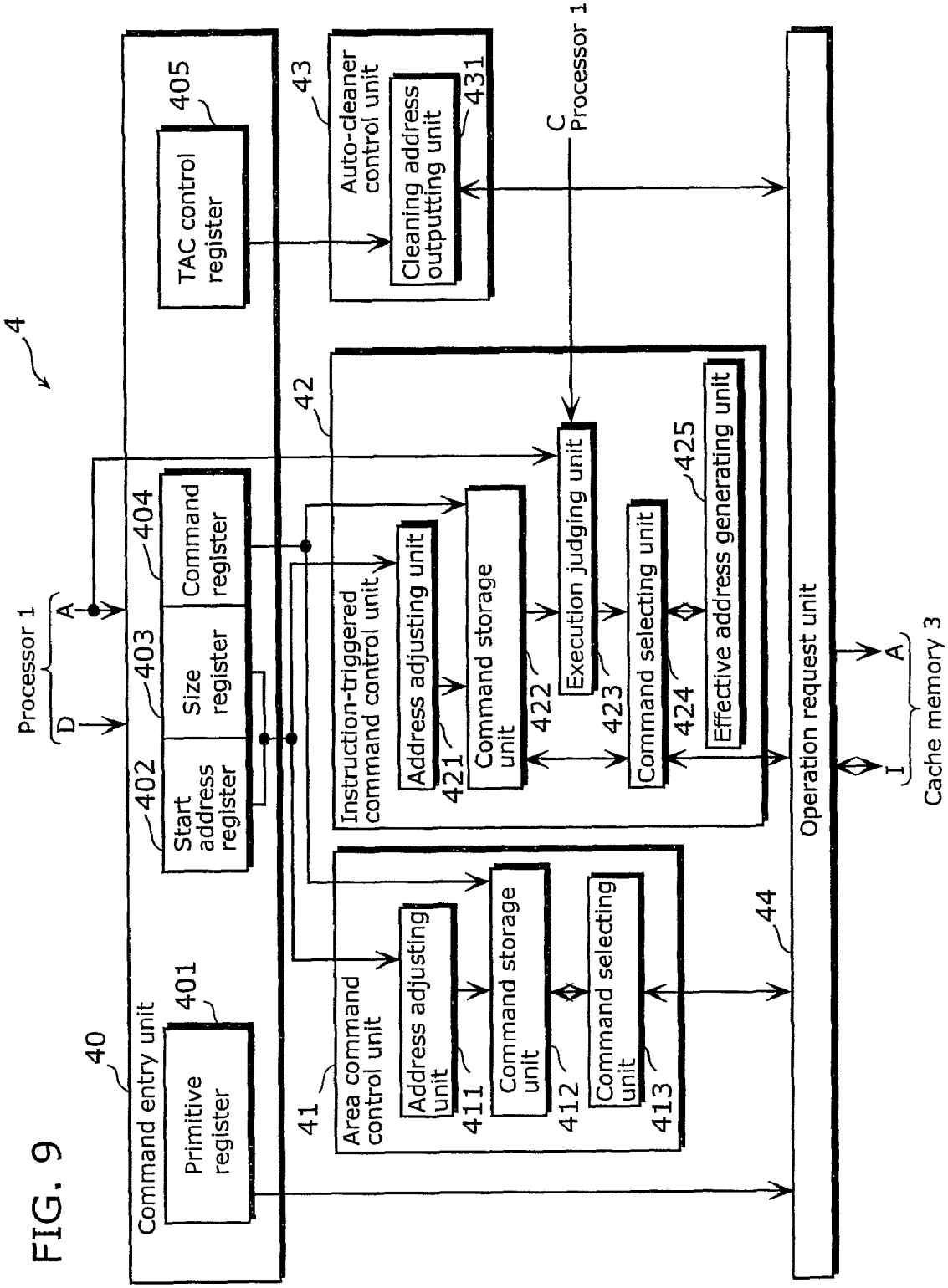
FIG. 9 is a block diagram showing an example of the structure of the TAC.

FIG. 9 is a block diagram showing an example of the structure of the TAC 4. The TAC 4 includes a command entry unit 40, an area command control unit 41, an instruction-triggered command control unit 42, an auto-cleaner control unit 43 and an operation request unit 44, so as to send, to the cache memory 3, a request for an operation corresponding to the command provided from the processor 1.

The command that the TAC 4 is provided from the processor 1 includes: a single command that indicates an operation against a single address; an instruction-triggered command that indicates an operation against plural addresses contained in an address area is executed in synchronization with a specific instruction executed by the processor; an area command that indicates an operation against plural addresses contained in an address area is executed in asynchronization with a specific instruction executed by the processor, and an auto-cleaner command that indicates cache data is written back successively.

The command entry unit 40 is a register group into which a command and an address are written by an execution of a predetermined instruction by the processor 1, and includes an operation primitive register 401, a start address register 402, a size resister 403, a command register 404 and a TAC control register 405. These registers are capable of receiving a direct access by the processor 1 by, for example, being allocated to a specified memory address in advance, and stores the content written by the processor 1.

The area command control unit 41 which stores up to four area commands is a functional block where a request corresponding to the stored command is generated, and includes an address adjusting unit 411, a command storage unit 412 and a command selecting unit 413.

The instruction-triggered command control unit 42 is a functional block which stores up to four instruction-triggered commands and generates a request corresponding to the stored command in synchronization with a specific instruction to be executed by the processor 1, and includes an address adjusting unit 421, a command storage unit 422, an execution judging unit 423, a command selecting unit 424 and an effective address generating unit 425.

The auto-cleaner control unit 43 is a functional block which generates an auto-cleaning request, and includes a cleaning address outputting unit 431.

<Command Entry Unit>

A single command is written into and stored in the operation primitive resister 401.

Figure 10A:
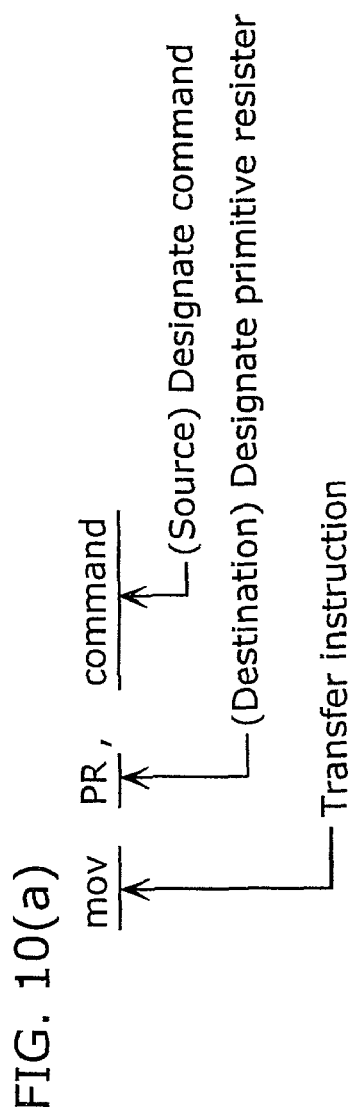
FIG. 10(a) is a diagram showing an example of the instruction for writing a command to the operation primitive register.
Figure 10B:
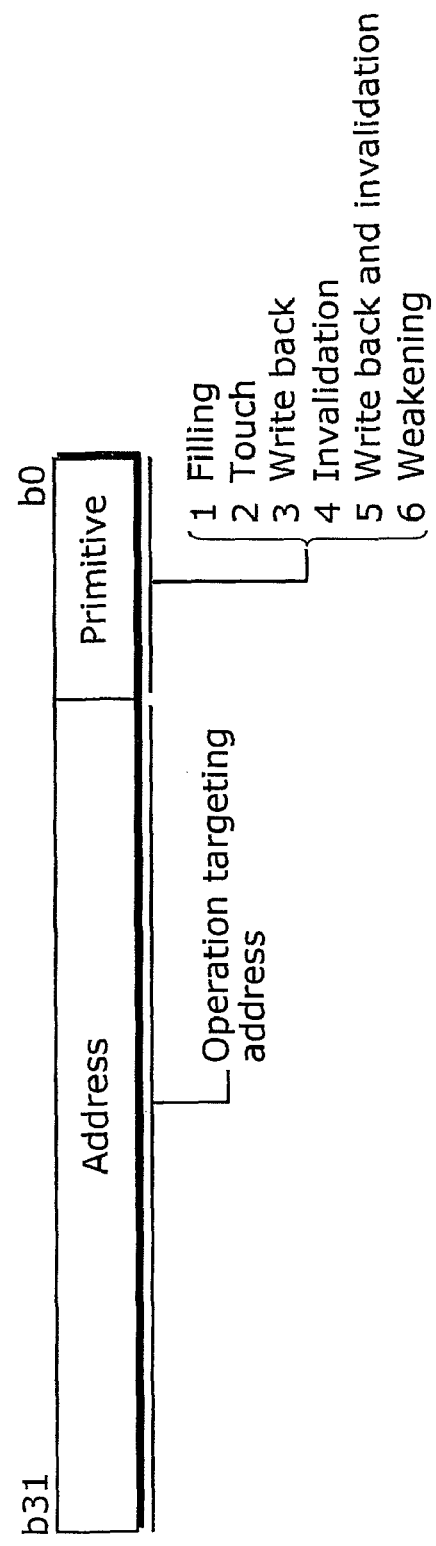
FIG. 10(b) is a diagram showing an example of a command.

An example of the instruction for writing a single command into the operation primitive register 401 is shown in FIG. 10(*a*). This instruction is a standard transfer instruction (mov instruction), and designates the command as a source operand and the operation primitive register (PR) 401 as a destination operand.

An example of a command format is shown in FIG. 10(*b*). This command format includes an operation target address and a designation of the operation primitive.

The command entry unit 40 outputs request corresponding to the single command stored in the operation primitive resister 401 to the operation request unit 44.

The area command and the instruction-triggered command is written into the start address register 402, the size register 403 and the command register 404.

An example of the instruction for writing a start address into the start address register (SAR) 402 is shown in FIG. 11(*a*). This instruction is also a standard transfer instruction just as the one in FIG. 10(*a*). The start address indicates the initial address of the operation target of the command.

An example of the instruction for writing a size into the size register (SR) 403 is shown in FIG. 11(*b*). This instruction is also a standard transfer instruction. The size indicates the size of the operation target. The size unit may be the number of bytes or may be the number of the lines (the number of the cache entry), as long as it is a predetermined unit.

Figure 11A:
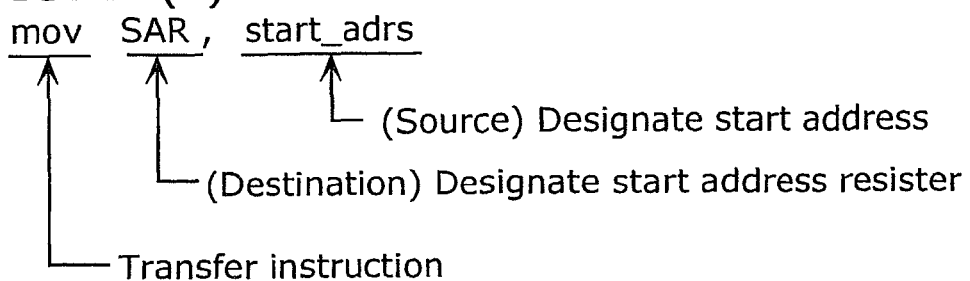
FIG. 11(a) is a diagram showing an example of the instruction for writing a start address into a start address register.
Figure 11B:
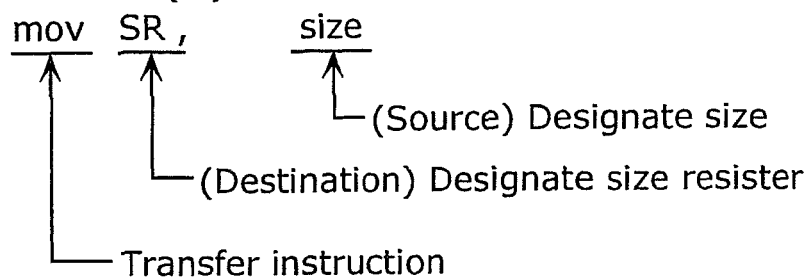
FIG. 11(b) is a diagram showing an example of the instruction for writing a size into a size register.
Figure 11C:
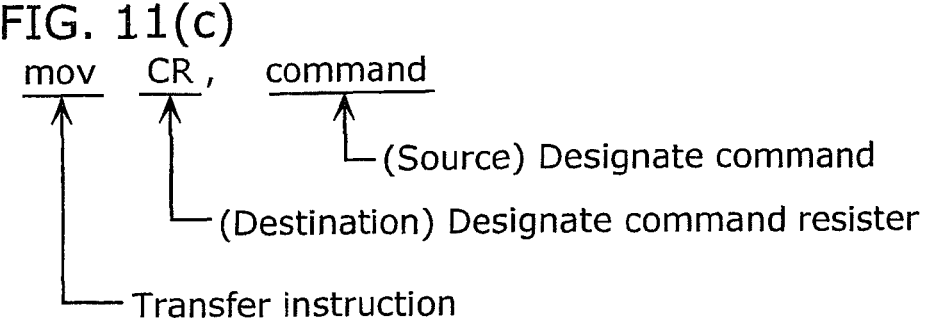
FIG. 11(c) is a diagram showing an example of the instruction for writing a command into a command register.

An example of the instruction for writing a command into the command register (CR) 404 is shown in FIG. 11(c). This instruction is also a standard transfer instruction.

Figure 11D:
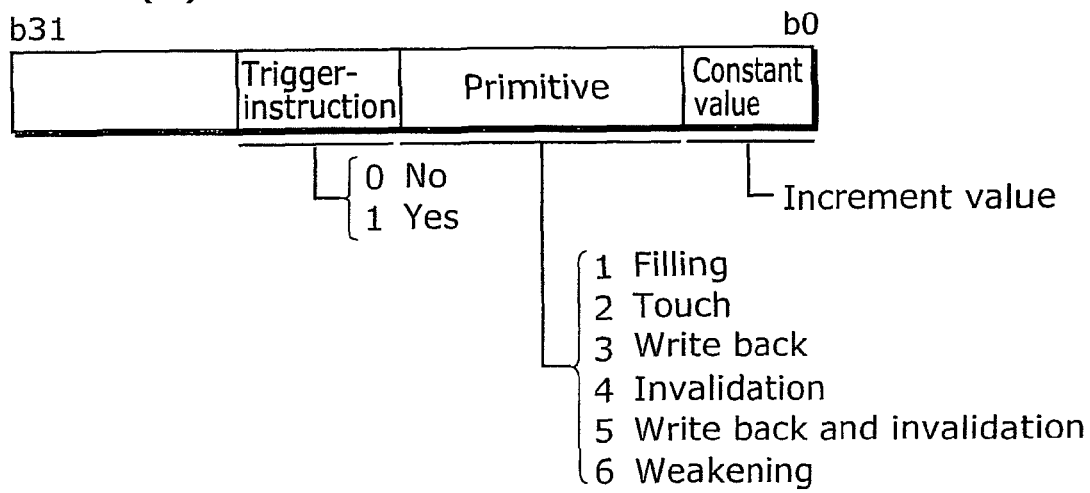
FIG. 11(d) shows an example of a command.

An example of a command format is shown in FIG. 11(d). This command format includes: an instruction trigger flag that designates whether or not the operation request should correspond to an execution of a specific instruction (in other words, whether the command is an instruction-triggered command or an area command); designation of the operation primitive, and an increment value that indicates an address interval between plural addresses to be the operation target within the designated address area.

By setting the increment value as, for example, the size of the line, the intended operation may be executed sequentially on all of the cache data within the address area. In addition, in the case where the specific instruction is an instruction to load and store with a post-increment, by setting the increment value as the value of the post-increment of the instruction, the intended operation may be executed sequentially on the target for the operation of the instruction.

When the above-mentioned content is written into the start address register 402, the size register 403 and the command register 404, the command entry unit 40 outputs it, to the area command control unit 41 if the command is the area command, and to the instruction-triggered command control unit 42 if the command is the instruction-triggered command.

The auto-cleaner command is located in the predetermined bit position within the TAC control register 405 and updates the value of the auto-cleaner flag which indicates whether the auto-cleaner is valid or invalid.

FIG. 12(a) shows an example of the instruction for updating (together with the entire content of the TAC control register 405) the auto-cleaner flag. This instruction is also a standard transfer instruction.

An example of a command format is shown in FIG. 12(b). This command format, corresponding to the format of the TAC control register, includes a new value of the auto-cleaner flag in the bit position.

The command entry unit 40 outputs the value of the auto-cleaner flag stored in the TAC control register 405, to the auto-cleaner control unit 43.

<Area Command Control Unit>

In the area command control unit 41, the address adjusting unit 411 obtains, from the command entry unit 40, addresses indicating the range of an area regarding the area command and adjusts the addresses at both ends of the area so that each of the addresses at both ends of the area points the starting data of a cache entry, the command storage unit 412 stores up to four area commands whose address area has been adjusted and the command selecting unit 413 selects one of the stored area commands (for example, the one which has been stored for the longest time), generates a request according to the selected area command and outputs the request to the operation request unit 44.

<Address Adjusting Unit>

Details of the address adjustment function of the address adjusting unit 411 will be described below.

First, the address adjusting unit 411 adds the start address which is stored in the address register 402 to the size stored in the size register 403. The result of the addition is an end address which indicates an end position of the address area. The size may be, as mentioned above, represented by any unit as long as it is represented by a predetermined unit, and may be added as a byte address when the unit is a byte, and as a line address when the unit is a line.

Next, the address adjusting unit 411 adjusts the start address and the end address.

Figure 13:
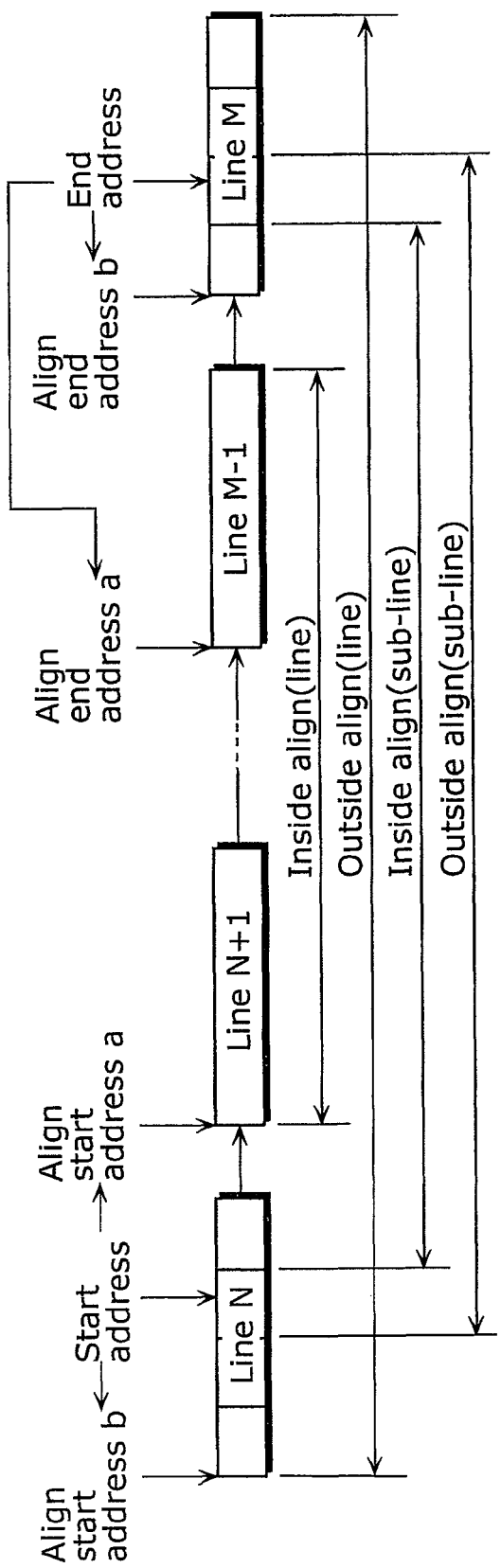
FIG. 13 is a conceptual diagram explaining the details of an address adjustment.

FIG. 13 is a conceptual diagram explaining the details of the adjustment. In this diagram, the start address points any position other than a starting position of a line N. The start address is adjusted to an align start address a so as to point the starting position of the next line (N+1), or to an align start address b so as to point the starting position of the line N which includes data of the start address. A line indicated by the align start address is called a start line.

Further, the end address points any position other than the starting position of a line M. The end address is adjusted to an align end address a so as to point the starting position of the immediately preceding line (M−1), or to an align end address b so as to point the starting position of the line M which includes data of the end address. A line pointed by an align end address is called an end line.

As described above, the start address and the end address are aligned inside or outside on a line-by-line basis. After the outside alignment on the line-by-line basis, further outside and inside alignment may be carried out on the sub-line basis.

By this alignment, the processor 1 may designate any start address and an any size, regardless of the line size and the line boundary.

<Command Storage Unit>

The command storage unit 412 obtains the align start address and the align end address from the address adjusting unit 411 as well as obtaining and storing the operation primitive and the increment value from the command register 404.

Figure 14:
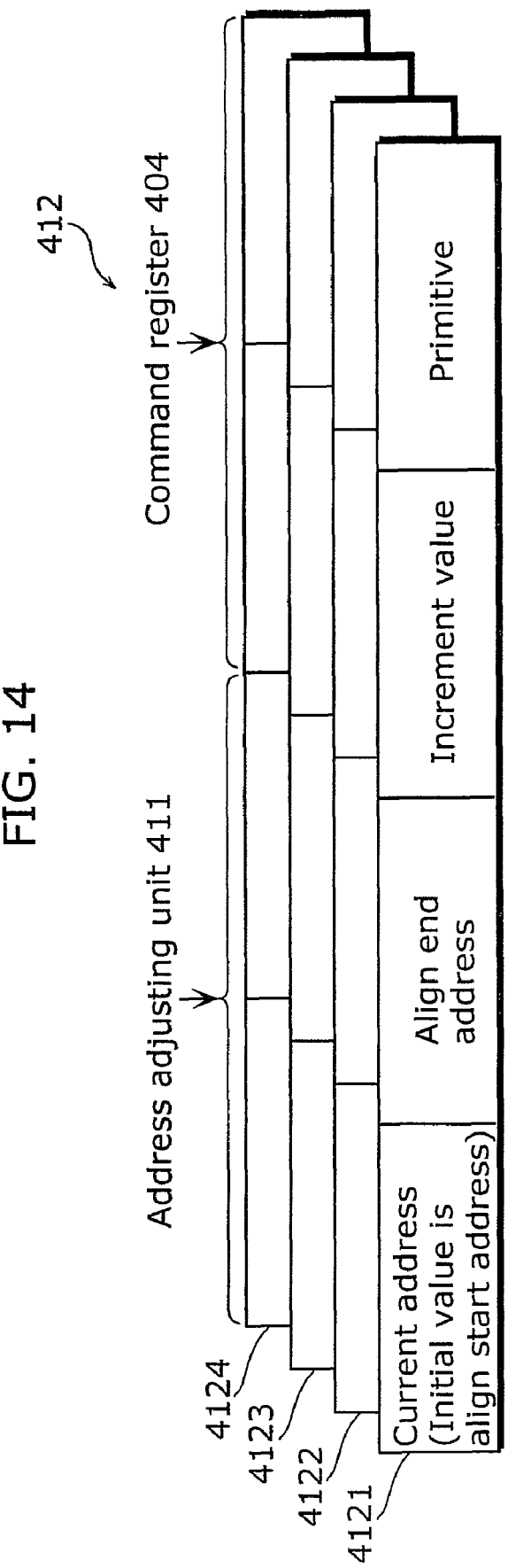
FIG. 14 is a block diagram showing an example of the structure of an address storage unit.

FIG. 14 is a block diagram showing a structure of an command storage unit 412. The command storage unit 412 is composed of four registers 4121 to 4124 and, preferably, the content of each register may be a queue which can be read out and uses a FIFO (First In First Out) method. Each register holds an align start address and an align end address which have been obtained from the address adjusting unit 411, and an increment value and an operation primitive which have been obtained from the command register 404. The align start address is updated successively by adding the increment value in response to each request according to the control from the operation request unit 44, and used as a current address.

<Command Selecting Unit>

The command selecting unit 413 selects one of commands stored in the command storage unit 412 (for example, the one stored longest, in other words, the head of the FIFO queue), generates a request indicating the current address and the operation primitive and output it to the operation request unit 44.

<Area Command Control Processing>

Figure 15:
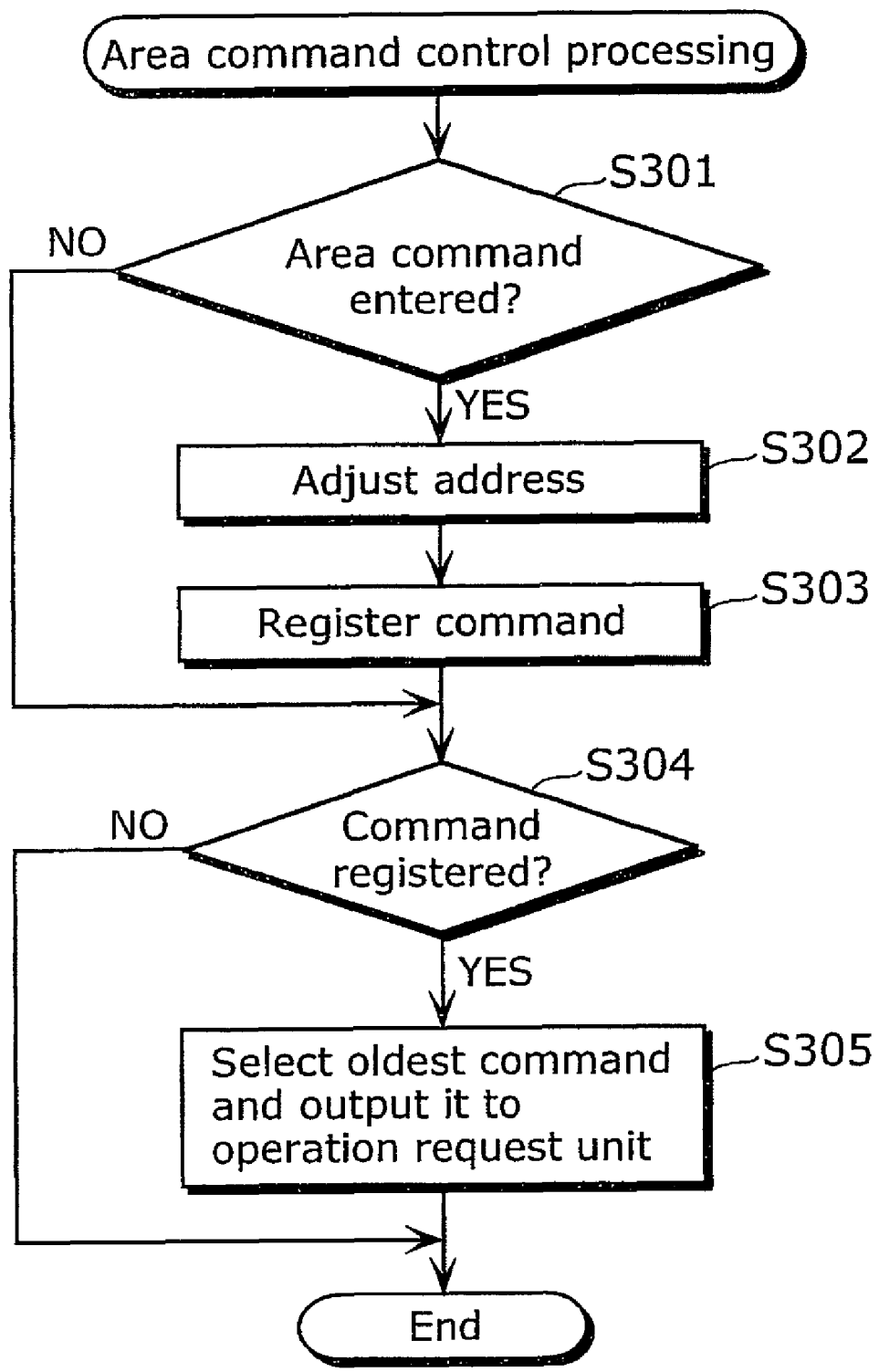
FIG. 15 is a flowchart showing an example of an area command control processing in an area command control unit.

FIG. 15 is a flowchart showing an example of an area command control processing in an area command control unit 41.

When an area command is entered to the command entry unit 40 (S301: YES), the address adjusting unit 411 adjusts an address of the command (S302) and register the command whose address has been adjusted to the command storing unit 412 (S303). This command is registered to a register in which no command is stored yet or, in the case where all resisters store a command, is registered by overwriting the oldest command. In addition, it is possible to overwrite a command in which the current address becomes larger than the align end address (this means that the request for the operation against all the target addresses has been completed) or delete such command in advance. Further, in the case where all registers have a command, it may be considered to cause an exception in the processor 1 by not registering the command.

When the command is registered (S304: YES), the command selecting unit 413 selects the oldest command and outputs a request indicating the current address and the operation primitive to the operation request unit 44 (S305).

Note that the command selecting unit 413 may select a command other than the oldest one. Specifically, for example, it may be considered that, by providing a structure in which the task which issued each command and the current task which is currently executed by the processor 1 are respectively identified, the command provided by the current task is selected in preference to the oldest command.

This structure is suitable for, for example, the case where the processor 1 performs a multitask processing, in which a command provided from the current task is preferentially processed following a task switching. Furthermore, since the command storage unit 412 stores a current address for each command, even in the case where the first command is reselected after the second command has been selected, it is possible to request an operation of the reselected first command against the address to which the operation has not been requested yet.

<Instruction-Triggered Command Control Unit>

In the instruction-triggered command control unit 42, the address adjusting unit 421 obtains, from the command entry unit 40, addresses indicating the range of an area regarding the instruction-triggered command and adjusts the addresses at both ends of the area so that each of the addresses at both ends of the area points the starting data of a cache entry and the command storage unit 422 stores up to four instruction-triggered commands whose address area has been adjusted. The execution judging unit 423 judges whether or not the processor has executed a specific instruction to a prediction address which is set to each of the stored command. The command selecting unit 424 selects a command from the commands judged affirmatively (for example, the one which is stored longest), and outputs a request, to the operation request unit 44, against an effective address generated by the effective address generating unit 425.

Since the address adjusting unit 421 and the command storage unit 422 correspond to the address adjusting unit 411 and the command storage unit 412 respectively, descriptions are omitted.

<Execution Judging Unit>

The execution judging unit 423 judges whether or not an identifying instruction (specifically, a loading instruction with post increment and a storing instruction with post increment) whose operand corresponds to the prediction address has been executed by the processor 1, by utilizing the current address of each command stored in the command storing unit 422 as the prediction address. For the above judgment, for example, the processor 1 may supply the execution judging unit 423 with a signal C which indicates the loading instruction with post increment and the storing instruction with post increment are under the processing, and the execution judging unit 423 may compare an address which appears in an address bus to each current address stored in the command storage unit 422, during the period in which the signal C is supplied.

<Command Selecting Unit and Effective Address Generating Unit>

The command selecting unit 424 selects one of the commands which have been judged affirmatively (for example, the one which is stored longest) by the execution judging unit 423. In the case where the selected command indicates filling or touch, the effective address generating unit 425 generates an effective address which is a target for the operation by the command, by adding an offset value for 1 line to the current address (the earlier-described prediction address) of the command. In addition, in the case where the selected command indicates the write back, the invalidation, the write back and invalidation, or the weakening, the effective address generating unit 425 generates an effective address which is a target for the operation by the command, by subtracting an offset value for 1 line from the current address of the command. The operation request unit 424 generates a request which indicates the effective address and the designation of the operation primitive, and output the request to the operation request unit 44, and updates the current address which corresponds to the selected command by increasing the current address corresponding to the selected command by an increment value.

Note that an offset value for 1 line is used since the unit for replacement is a line, a smaller offset value (for example, for two sub-lines) may be used in the case where the unit for replacement is a sub-line.

<Instruction-Triggered Command Control Processing>

Figure 16:
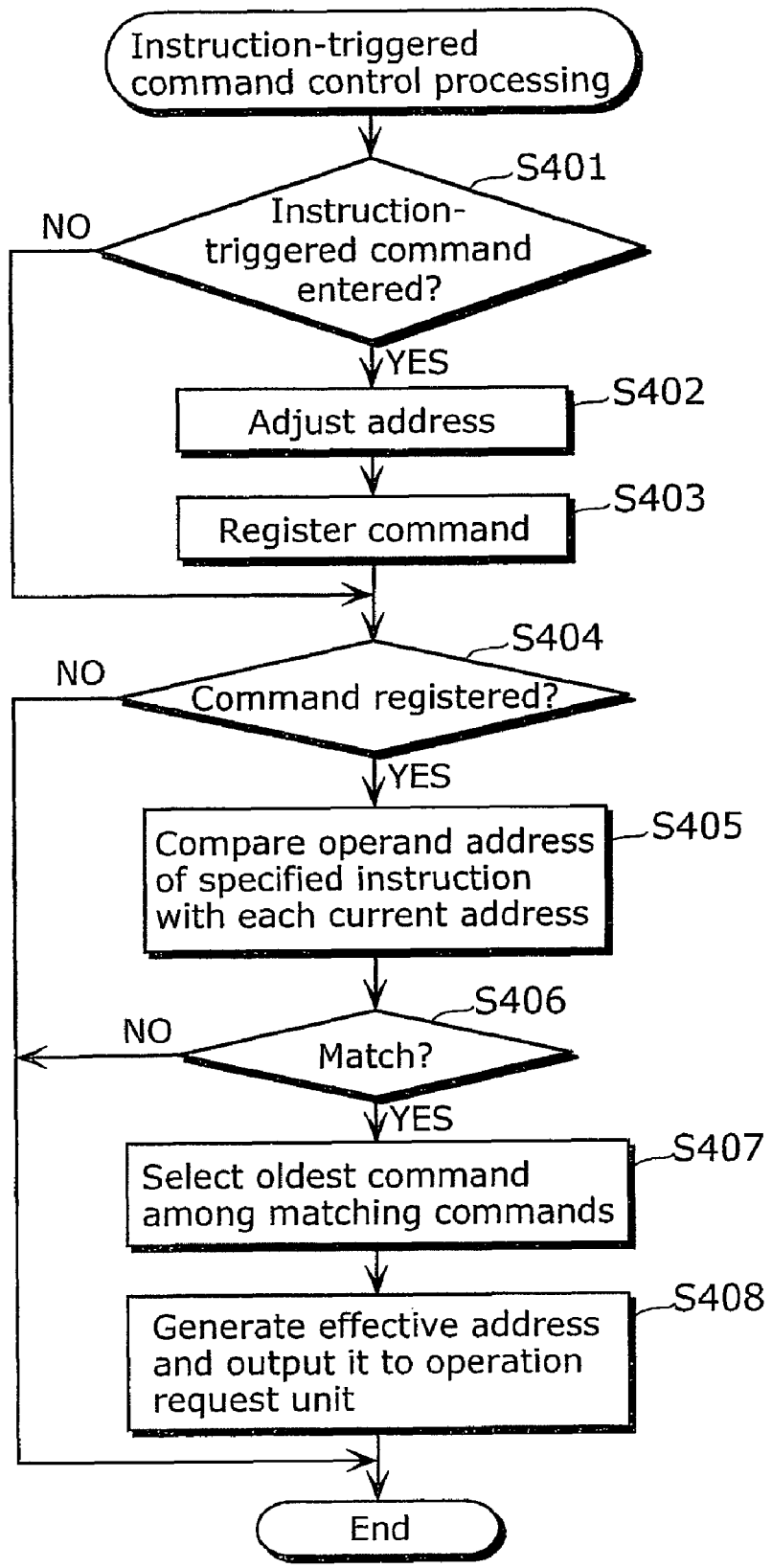
FIG. 16 is a flowchart showing an example of an instruction-triggered command control processing in an instruction-triggered command control unit.

FIG. 16 is a flowchart showing an example of an instruction-triggered command control processing in an instruction-triggered command unit 42.

When an instruction-triggered command is entered to the command entry unit 40 (S401: YES), the address adjusting unit 421 adjusts an address of the command (S402) and registers the command whose address has been adjusted to the command storage unit 422 (S303). Just as in the case of the area command, this command is registered to a register in which no command is stored, or in the case where all resisters store a command, it is registered by overwriting the oldest command. In addition, it is possible to overwrite a command in which the current address becomes larger than the align end address (in other words, requests against all the target addresses within the address area have been issued) or delete such command in advance. Further, in the case where all registers have a command, it is possible to cause an exception in the processor 1 by not registering the command.

When the command is registered (S404: YES), the execution judging unit 423 compares the operand address of the identifying instruction mentioned above with the current address for each command (S405). When there are commands whose addresses have matched (S406: YES), the command selecting unit 424 selects the oldest command among them (S407), the effective address generating unit 425 generates an effective address regarding the selected command, the command selecting unit 424 outputs a request which indicates the effective address and the operation primitive to the operation request unit 44 and updates the current address which corresponds to the selected command by increasing the current address by an increment value (S408).

<Auto-Cleaner Control Unit>

In the auto-cleaner control unit 43, the cleaning address outputting unit 431 successively outputs addresses which indicate the respective cache entries in the cache memory 3. The cleaning address outputting unit 431 may simply be a register which stores and outputs addresses.

For this cleaning addresses, for example, in the cache memory of a four-way set associative method (See FIG. 2), the addresses which designate the respective sets may be used. Such addresses, to be more specific regarding the example shown in FIG. 2, are represented by 16 addresses located within a range from 0x00000000 to 0x00000780 at an interval of 0x0080 (unit address of the set). Since these addresses include all values of the set index SI, it is possible to designate all sets.

The auto-cleaner control unit 43 outputs a request for an auto-cleaner operation against the address outputted from the cleaning address outputting unit 431 to the operation request unit 44, while a flag value which indicates validity of the auto cleaner is obtained from the TAC control register 405.

<Auto-Cleaner Control Processing>

Figure 17:
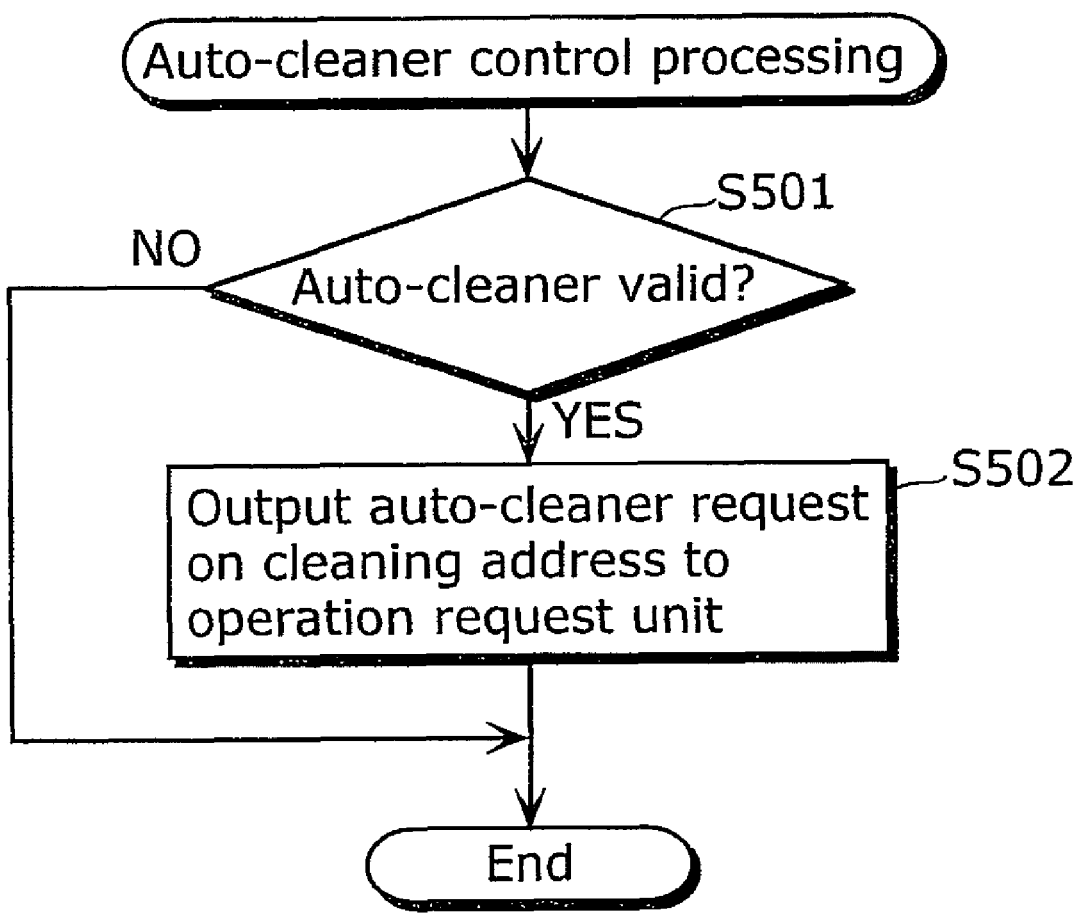
FIG. 17 is a flowchart showing an example of an auto-cleaner control processing in an auto-cleaner control unit

FIG. 17 is a flowchart showing an example of an auto-cleaner control processing in the auto-cleaner control unit 43.

In the case where a flag value which indicates validity of the auto-cleaner is obtained from the TAC control register 405 (S501: YES), the auto-cleaner control unit 43 outputs a request for an auto-cleaner operation against the address outputted from the cleaning address outputting unit 431 (S502).

<Operation Request Processing>

From the above description, it is possible that the operation request unit 44 receives the following four requests at the maximum: a request according to the single command, a request according to the instruction-triggered command, a request according to the area command and a request for an auto-cleaner operation. In the case where these requests are provided at the same time, the operation request unit 44 selects one request based on a predetermined priority and transfers the selected request to the cache memory 3. The predetermined priority may be the order of commands described above.

Further, when the operation request unit 44 has transmitted the request according to the instruction-triggered command, the request according to the area command and the request for the auto-cleaner operation, it controls the current address of the command and the cleaning address so that the operation target next to the request is indicated.

Figure 18:
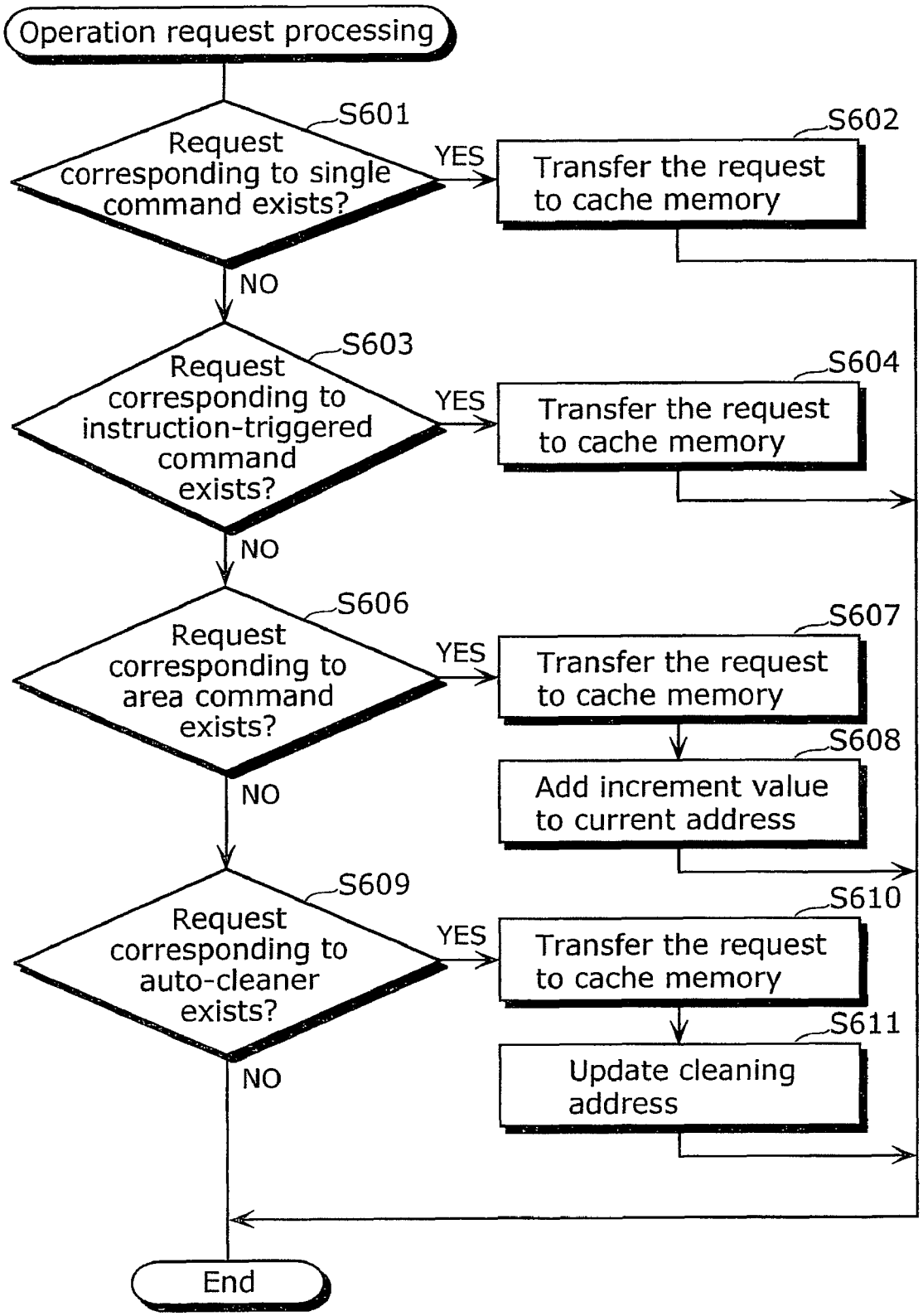
FIG. 18 is a flowchart showing an example of an operation request processing in an operation request unit.

FIG. 18 is a flowchart showing an example of an operation request processing in the operation request unit 44.

When the request according to a single command exists (S601: YES), the request is transferred to the cache memory 3 (S602). After the request according to a single command has been transferred, the operation request unit 44 may delete the content of the operation primitive register.

When the request according to an instruction-triggered command exists (S603: YES), the request is transferred to the cache memory 3 (S604). In the case where the current address of the command corresponding to the transferred request (which is incremented when the command is selected in the command selecting unit 424) is larger than the align end address, the command may be deleted.

When the request according to an area command exists (S606: YES), the request is transferred to the cache memory 3 (S607) Subsequently, the current address of the area command is updated by increasing the current address by the increment value through the area command control unit 41 (S608). In the case where the current address becomes larger than the align end address due to the update, the command may be deleted.

When the request according to an auto-cleaner command exists (S609: YES), the request is transferred to the cache memory 3 (S610). Subsequently, the auto-cleaner control unit 43 is controlled so as to increase the address outputted from the cleaning address outputting unit 431 by the unit address of the set.

<Conclusion>

As described above, the TAC 4 receives a command regarding a cache data transfer and attribute operation, by the execution of a predetermined instruction by the processor 1. Then the TAC 4 requests one of the six kinds of the operation primitives or the auto-cleaner operation to the cache memory 3, depending on the command. The cache memory 3 executes the operation according to the request from the TAC 4 during the intervals of conventional and common caching performed in response to a memory access from the processor 1.

These six kinds of the operation primitives and the auto-cleaner operation are effective in: improvement of cache hit ratio; reduction of unnecessary bus transaction and equalization of bus transactions (temporal distribution), and may be requested from software by execution of the predetermined instructions (for example, see FIG. 10, FIG. 11 and FIG. 12) by the processor 1. Thus, this structure is suitable, in order to carry out these operations under the active control by software so as to improve cache efficiency.

Further, such specified instructions may be inserted into programs by a compiler. Specifically, it may be considered that a compiler detects a program position where the data is accessed first, by judging data lifetime for example, and inserts a command which requests a filling operation just before the program position and, in a similar way, that a compiler detects a program position where no further writing is performed to the data, and inserts a command which requests a weakening operation just after the program position.

In view of the details of the six kinds of operation primitives and the auto-cleaner carried out by the cache memory 3, the cache memory 3 is realized without significant addition or modification to the conventional hardware which performs general caching operations corresponding to a memory access from a processor.

The TAC 4 also performs simple functions only, such as command acquisition from the processor 1, queuing and selection of the commands, generating requests successively against plural addresses and management of transferring requests to the cache memory 3.

By simplifying hardware to this extent and making the hardware structure suitable to accept control from software, it is possible to optimally share functional rolls between hardware and software. Consequently, it is possible to avoid unnecessary upsizing of hardware for the purpose of improving cache efficiency by autonomous control.

INDUSTRIAL APPLICABILITY

The present invention is applicable to a cache memory that improves software controllability. For example, it is suited to an on-chip cache memory, an off-chip cache memory, a data cache memory, an instruction cache memory and the like.

The invention claimed is:

1. A cache memory system, comprising:
  a cache memory provided between a processor and a memory; and
  a transfer and attribute controller which requests, to said cache memory, a transfer and attribute operation of cache data,
  wherein said cache memory includes a controller which controls an execution of the transfer and attribute operation of cache data based on a memory access provided by said processor and a request from said transfer and attribute controller,
  wherein said transfer and attribute controller includes:
    a command entry unit operable to receive, as a result of an execution of a predetermined instruction by said processor, a command which indicates a transfer and attribute operation of cache data and an address designating a target for the operation; and
    an operation request unit operable to request an operation on the address to said cache memory, the operation being indicated by the command,
  wherein said cache memory includes the following in association with a cache entry which is a unit for managing cache data:

a tag storage unit in which a tag is stored, the tag indicating a significant part of a memory address corresponding to the cache data stored in the cache entry; and a flag storage unit in which a valid flag, a dirty flag and a weak flag are stored, the valid flag indicating whether the cache entry is valid, the dirty flag indicating whether a write operation has been performed on the cache entry and the weak flag indicating that an access order of the cache entry has been compulsorily rendered oldest, and wherein said cache memory is operable to execute one of the following operations in response to a request from said transfer and attribute controller:

a filling operation performed, when there is no cache entry in which a hit occurs for a designated address, by selecting a cache entry to be a replacement target, loading data corresponding to the designated address from a memory into the selected cache entry, defining a value of the tag, and setting the valid flag;

a touch operation performed, when there is no cache entry in which a hit occurs for a designated address, by selecting the cache entry to be the replacement target, defining the value of the tag and setting the valid flag, without loading data from the memory into the selected cache entry;

a write back operation performed, when there is a cache entry in which a hit occurs for a designated address and the dirty flag is already set, by saving the data of the cache entry into the memory and resetting the dirty flag;

an invalidation operation performed, when there is a cache entry in which a hit occurs for a designated address, by resetting the valid flag without saving the data of the cache entry into the memory, regardless of the value of the dirty flag;

a write back and invalidation operation performed, when there is a cache entry in which a hit occurs for a designated address, by saving the data of the cache entry into the memory and resetting the dirty flag and the valid flag when the dirty flag is already set, and carrying out only the resetting of the valid flag of the cache entry when the dirty flag is already reset; and a weakening operation performed, when there is a cache entry in which a hit occurs for a designated address, by setting the weak flag of the cache entry.

2. The cache memory system according to claim 1, wherein said command entry unit is operable to further receive, from said processor, an address area corresponding to the command, and wherein said operation request unit is operable to successively request, to said cache memory, the operation on a plurality of addresses belonging to the address area.

3. The cache memory system according to claim 2, wherein said transfer and attribute controller further includes an address adjusting unit operable to adjust a start address and an end address of the address area so that the addresses indicate the starting data of a cache entry which is the operation entry unit for managing cache data in said cache memory, and wherein said operation request unit successively requests, to said cache memory, the operation on a plurality of addresses in the adjusted address area.

4. The cache memory system according to claim 3, wherein said transfer and attribute controller further includes a command storage unit in which a plurality of commands and the address areas are stored, each of the address areas corresponding to the respective commands; and a command selecting unit operable to select a command from among the stored commands, and wherein said operation request unit is operable to successively request the operation, indicated by the command, on the addresses belonging to the address area corresponding to the selected command.

5. The cache memory system according to claim 2, wherein said transfer and attribute controller further includes a command storage unit in which a plurality of commands and the address areas are stored, each of the address areas corresponding to the respective commands; and a command selecting unit operable to select a command from among the stored commands, and wherein said operation request unit is operable to successively request the operation, indicated by the command, on the addresses belonging to the address area corresponding to the selected command.

6. The cache memory system according to claim 5, wherein said command selecting unit is operable to select another command before all requests regarding the selected command are made, and wherein said operation request unit, when the former selected command is reselected, is operable to successively request the operation regarding the former selected command on addresses to which the operation of the former command has not been requested yet.

7. The cache memory system according to claim 2, wherein said transfer and attribute controller further includes an execution judging unit operable to judge whether a specific instruction has been executed by said processor on a prediction address designated for an operation to be requested next; and an effective address generating unit operable to generate, when judged affirmatively, an effective address by adding or subtracting a predetermined offset value to or from the prediction address, and wherein the operation request unit is operable to request the operation on the generated effective address.

8. The cache memory system according to claim 7, wherein said transfer and attribute controller further includes a command storage unit in which a plurality of commands and the address areas are stored, each of the address areas corresponding to the respective commands, wherein said execution judging unit is operable to judge, regarding each of the stored commands, whether a specific instruction on the prediction address corresponding to each of the stored commands has been executed by said processor, wherein said transfer and attribute controller further includes a command selecting unit operable to select a command from among the commands judged affirmatively, wherein said effective address generating unit is operable to generate an effective address by adding or subtracting a predetermined value to or from the prediction address corresponding to the selected command, and wherein said operation request unit is operable to request the operation on the generated effective address, the operation being indicated by the selected command.

9. The cache memory system according to claim 1,
wherein said transfer and attribute controller further includes an address outputting unit operable to successively output the address which designates each cache entry which is the unit for managing cache data in said cache memory, and
wherein said operation request unit includes a request storage unit in which one of operation requests on at least one cache entry is stored, the cache entry including the cache entry designated by the outputted address, and continues to make an operation request autonomously while the operation request is stored.

10. The cache memory system according to claim 9,
wherein said operation request unit is operable to request the write back operation to said cache memory, and
wherein said cache memory is operable to execute the write back operation according to the request.

11. The cache memory system according to claim 1,
wherein said operation request unit is operable to request the write back operation to said cache memory, and
wherein said cache memory is operable to execute the write back operation according to the request.

12. The cache memory system according to claim 1,
wherein said command entry unit is operable to receive at least one of the following commands from said processor:
a single command which indicates the operation on a single address;
an instruction-triggered command which indicates that the operation on a plurality of addresses included in the address area is executed in synchronization with a specific instruction to be executed by said processor;
an area command which indicates that the operation on a plurality of addresses included in the address area is executed in asynchronization with the specific instruction to be executed by said processor; and
a successive operation command which indicates that cache data is operated successively, and
wherein the operation request unit is operable to select an operation request corresponding to each command, based on a predetermined order of priority, and to request the operation to said cache memory.

13. The cache memory system according to claim 12,
wherein said operation request unit is operable to request the operation corresponding to each command to said cache memory, in the order predetermined for the command.

14. The cache memory system according to claim 1,
wherein said command entry unit includes a register which is assigned to a predetermined memory address and to which data indicating the command is set as a result of an execution of the predetermined instruction by said processor, and
wherein said transfer and attribute controller requests, to said controller of said cache memory, the operation which is indicated by the command set by said register.

15. The cache memory system according to claim 1,
wherein said command entry unit is operable to further receive, from said processor, an address area corresponding to the command, and
wherein said operation request unit is operable to successively request, to said cache memory, the operation on a plurality of addresses belonging to the address area.

16. The cache memory system according to claim 1,
wherein said command entry unit is operable to receive at least one of the following commands from said processor:
a single command which indicates the operation on a single address;
an instruction-triggered command which indicates that the operation on a plurality of addresses included in the address area is executed in synchronization with a specific instruction to be executed by said processor;
an area command which indicates that the operation on a plurality of addresses included in the address area is executed in asynchronization with the specific instruction to be executed by said processor; and
a successive operation command which indicates that cache data is operated successively, and
wherein the operation request unit is operable to select an operation request corresponding to each command, based on a predetermined order of priority, and to request the operation to said cache memory.

17. A method for controlling a cache memory system which includes: a cache memory provided between a processor and a memory; and a transfer and attribute controller which requests, to said cache memory, a transfer and attribute operation of cache data, said method comprising:
controlling, in said cache memory, an execution of the transfer and attribute operation of cache data based on an memory access provided by said processor and a request from said transfer and attribute controller;
acquiring, in said transfer and attribute controller, from said processor, a command indicating a transfer and attribute operation of cache data and an address which designates a target for the operation; and
requesting an operation on the address from said transfer and attribute controller to said cache memory, the operation being indicated by the command,
wherein said cache memory includes the following in association with a cache entry which is a unit for managing cache data:
a tag storage unit in which a tag is stored, the tag indicating a significant part of a memory address corresponding to the cache data stored in the cache entry; and
a flag storage unit in which a valid flag, a dirty flag and a weak flag are stored, the valid flag indicating whether the cache entry is valid, the dirty flag indicating whether a write operation has been performed on the cache entry and the weak flag indicating that an access order of the cache entry has been compulsorily rendered oldest, and
wherein said cache memory is operable to execute one of the following operations in response to a request from said transfer and attribute controller:
a filling operation performed, when there is no cache entry in which a hit occurs for a designated address, by selecting a cache entry to be a replacement target, loading data corresponding to the designated address from a memory into the selected cache entry, defining a value of the tag, and setting the valid flag;
a touch operation performed, when there is no cache entry in which a hit occurs for a designated address, by selecting the cache entry to be the replacement target, defining the value of the tag and setting the valid flag, without loading data from the memory into the selected cache entry;
a write back operation performed, when there is a cache entry in which a hit occurs for a designated address and the dirty flag is already set, by saving the data of the cache entry into the memory and resetting the dirty flag;

an invalidation operation performed, when there is a cache entry in which a hit occurs for a designated address, by resetting the valid flag without saving the data of the cache entry into the memory, regardless of the value of the dirty flag;

a write back and invalidation operation performed, when there is a cache entry in which a hit occurs for a designated address, by saving the data of the cache entry into the memory and resetting the dirty flag and the valid flag when the dirty flag is already set, and carrying out only the resetting of the valid flag of the cache entry when the dirty flag is already reset; and a weakening operation performed, when there is a cache entry in which a hit occurs for a designated address, by setting the weak flag of the cache entry.

18. A cache memory system, comprising:

a cache memory provided between a processor and a memory; and a transfer and attribute controller which requests, to said cache memory, a transfer and attribute operation of cache data, wherein said cache memory includes a controller which controls an execution of the transfer and attribute operation of cache data based on a memory access provided by said processor and a request from said transfer and attribute controller, wherein said transfer and attribute controller includes:

a command entry unit operable to receive, as a result of an execution of a predetermined instruction by said processor, a command which indicates a transfer and attribute operation of cache data and an address designating a target for the operation; and an operation request unit operable to request an operation on the address to said cache memory, the operation being indicated by the command, wherein said command entry unit is operable to further receive, from said processor, an address area corresponding to the command, wherein said operation request unit is operable to successively request, to said cache memory, the operation on a plurality of addresses belonging to the address area, wherein said transfer and attribute controller further includes an address adjusting unit operable to adjust a start address and an end address of the address area so that the addresses indicate the starting data of a cache entry which is the command entry unit for managing cache data in said cache memory, and wherein said operation request unit successively requests, to said cache memory, the operation on a plurality of addresses in the adjusted address area.

* * * * *